(12) United States Patent
Okugawa et al.

(10) Patent No.: US 7,243,491 B2
(45) Date of Patent: Jul. 17, 2007

(54) EXHAUST GAS PURIFICATION SYSTEM OF INTERNAL COMBUSTION ENGINE

(75) Inventors: Shinichiro Okugawa, Toyota (JP); Masumi Kinugawa, Okazaki (JP); Kazuo Kobayashi, Nagoya (JP); Tsukasa Kuboshima, Okazaki (JP)

(73) Assignee: DENSO Corporation, Kariya (JP)

( * ) Notice: Subject to any disclaimer, the term of this patent is extended or adjusted under 35 U.S.C. 154(b) by 278 days.

(21) Appl. No.: 10/845,066

(22) Filed: May 14, 2004

(65) Prior Publication Data
US 2004/0226288 A1    Nov. 18, 2004

(30) Foreign Application Priority Data

| May 16, 2003 | (JP) | ............................. 2003-138351 |
| Jul. 9, 2003 | (JP) | ............................. 2003-272267 |
| Jan. 29, 2004 | (JP) | ............................. 2004-021150 |
| Feb. 26, 2004 | (JP) | ............................. 2004-051515 |

(51) Int. Cl.
    *F01N 3/02*    (2006.01)
(52) U.S. Cl. ............................. 60/311; 60/274; 60/286; 60/295; 60/297; 60/303
(58) Field of Classification Search .................. 60/285, 60/286, 295, 297, 300, 303, 311
See application file for complete search history.

(56) References Cited

U.S. PATENT DOCUMENTS

| 6,199,375 B1 * | 3/2001 | Russell ........................ 60/286 |
| 6,378,297 B1 * | 4/2002 | Ito et al. ........................ 60/284 |
| 6,594,990 B2 * | 7/2003 | Kuenstler et al. ............. 60/295 |
| 6,708,487 B2 * | 3/2004 | Morimoto et al. ............ 60/295 |
| 6,758,037 B2 * | 7/2004 | Terada et al. .................. 60/295 |
| 6,865,885 B2 * | 3/2005 | Kitahara ........................ 60/311 |
| 6,948,311 B2 * | 9/2005 | Schaller et al. ............... 60/286 |
| 6,952,919 B2 * | 10/2005 | Otake et al. .................. 60/295 |
| 6,959,541 B2 * | 11/2005 | Kosaka et al. ................ 60/295 |
| 6,969,413 B2 * | 11/2005 | Yahata et al. ............... 55/282.3 |
| 7,021,050 B2 * | 4/2006 | Nishimura et al. ........... 60/295 |
| 7,159,391 B2 * | 1/2007 | Kogo et al. ................... 60/297 |
| 2004/0194450 A1 * | 10/2004 | Tanaka et al. ................ 60/285 |

FOREIGN PATENT DOCUMENTS

| JP | 11-101122 | 4/1999 |
| WO | WO 0238932 A1 * | 5/2002 |

\* cited by examiner

*Primary Examiner*—Tu M. Nguyen
(74) *Attorney, Agent, or Firm*—Nixon & Vanderhye P.C.

(57) ABSTRACT

A diesel oxidation catalyst is disposed upstream of a diesel particulate filter (a DPF) disposed in an exhaust passage of a diesel engine. An electronic control unit (an ECU) operates a temperature increasing circuit, which performs post-injection, to eliminate particulate matters accumulated in the DPF. The ECU includes a first correcting circuit and a second correcting circuit. The first correcting circuit corrects a manipulated variable of the temperature increasing circuit based on a result of comparison between a target temperature and a temperature of the DPF estimated based on information related to an area upstream of the DPF. The second correcting circuit corrects the manipulated variable of the temperature increasing circuit based on a result of comparison between the target temperature and the temperature of the DPF estimated based on information related to an area downstream of the DPF.

23 Claims, 13 Drawing Sheets

EXHAUST GAS PURIFICATION SYSTEM OF INTERNAL COMBUSTION ENGINE

CROSS REFERENCE TO RELATED APPLICATION

This application is based on and incorporates herein by reference Japanese Patent Applications No. 2003-138351 filed on May 16, 2003, No. 2003-272267 filed on Jul. 9, 2003, No. 2004-21150 filed on Jan. 29, 2004 and No. 2004-51515, filed on Feb. 26, 2004.

BACKGROUND OF THE INVENTION

1. Field of the Invention

The present invention relates to an exhaust gas purification system of an internal combustion engine having a particulate filter in an exhaust passage. Specifically, the present invention relates to an exhaust gas purification system capable of efficiently regenerating a particulate filter by increasing temperature of the particulate filter.

2. Description of Related Art

In recent years, an exhaust gas purification system for inhibiting discharge of toxic components by treating exhaust gas discharged from an internal combustion engine by using a catalyst or a filter has been emphasized as one of measures for protecting the environment. For instance, an exhaust gas purification system, which has a diesel particulate filter (a DPF, hereafter) in an exhaust pipe and collects particulate matters discharged from a diesel engine with the DPF, is known. The DPF is regenerated by regularly combusting and eliminating the particulate matters accumulated in the DPF. Thus, the DPF can be used continuously.

The regeneration of the DPF is performed by increasing temperature of the DPF above a certain temperature (for instance, 600° C.) at which the particulate matters can be combusted, when the quantity of the particulate matters accumulated in the DPF (a particulate matter accumulation quantity, hereafter) reaches a predetermined value. The particulate matter accumulation quantity is calculated based on a pressure difference across the DPF, for instance. At that time, temperature increasing means performs post-injection, retardation of fuel injection timing, restriction of intake air or the like. The post-injection is an additional injection of a small amount of the fuel performed after a main injection, which is performed to operate the engine. However, these temperature increasing methods can deteriorate fuel consumption.

If the temperature of the DPF (DPF temperature T, hereafter) is low during the regeneration of the DPF, combustion speed of the particulate matters will be decreased as shown by a solid line "a" in FIG. 21. Accordingly, the regeneration of the DPF takes a long time and an amount of the fuel consumption is increased as shown by a broken line "b" in FIG. 21. If the DPF temperature T is high during the regeneration of the DPF, the combustion speed of the particulate matters is increased as shown by the solid line "a" in FIG. 21. In this case, the regeneration of the DPF is finished in a short time and the deterioration of the fuel consumption due to the regeneration of the DPF can be reduced as shown by the broken line "b" in FIG. 21. However, if the DPF temperature T is increased excessively, the DPF will be damaged or an oxidation catalyst supported on the DPF will be degraded because of the excessive temperature increase. An area "Ad" in FIG. 21 shows an area where the DPF can be damaged or the oxidation catalyst supported on the DPF can be degraded. Therefore, in order to inhibit the deterioration of the fuel consumption and to regenerate the DPF safely, the DPF temperature T has to be maintained in an appropriate range. Therefore, normally, temperature of the exhaust gas upstream or downstream of the DPF is sensed and the temperature increasing means is operated so that the sensed temperature approaches target temperature.

In a conventional technology disclosed in Unexamined Japanese Patent Application Publication No. H11-101122, an oxidation catalyst (a diesel oxidation catalyst: a DOC, hereafter) is serially disposed upstream of the DPF, and temperature of the exhaust gas upstream of the DPF and downstream of the DOC is sensed as the DPF temperature. If the DPF temperature (the temperature of the exhaust gas upstream of the DPF) shown by a thin line "b" in FIG. 22 exceeds a predetermined value (for instance, 500° C.) at a time point "tA", temperature increasing operation is stopped. Then, if the DPF temperature shown by the thin line "b" becomes lower than the predetermined temperature (for instance, 500° C.) at a time point "tB", the temperature increasing operation is started again. An "ON" state of a line "T-UP" in FIG. 22 represents a state in which the temperature increasing operation is performed by the temperature increasing means, and an "OFF" state of the line T-UP represents a state in which the temperature increasing operation is not performed.

However, the above technology performs an operation for merely switching the temperature increasing means, which performs the post-injection or the like, between the operated state and the stopped state. In this case, there is a possibility that the post-injection deteriorates the fuel consumption but the DPF is not substantially regenerated if the post-injection is performed but the DPF temperature decreases to low temperature (450° C. or under, for instance) because of a disturbance such as a change in an operating state of the engine. It is because the combustion speed of the particulate matters accumulated in the DPF is slow when the DPF temperature is low. In the above technology, it takes a long time to increase the DPF temperature to the proximity of the target temperature again in the case where the DPF temperature deviates from the target temperature largely during the regeneration of the DPF. As a result, the fuel consumption is deteriorated.

The DPF temperature is determined by a balance between heat generation through an oxidizing reaction of hydrocarbon due to a function of the oxidation catalyst, and heat radiation into the exhaust gas or a surrounding area. Therefore, in the case where a large amount of the exhaust gas passes through the DPF or in the case where the hydrocarbon is not supplied during deceleration and the like, the quantity of the radiated heat will exceed the quantity of the heat generated through the oxidizing reaction of the hydrocarbon, and the DPF temperature will decrease. If the DPF temperature once decreases, it takes a long time to achieve the target temperature TT even if the temperature increasing operation is started again.

If the temperature increasing operation is stopped at the time point tA in FIG. 22, low-temperature exhaust gas flows into the DOC and the heat generation through the oxidizing reaction of the hydrocarbon is stopped. Accordingly, the temperature of the DOC disposed upstream of the DPF decreases rapidly as shown by a broken line "a" in FIG. 22. The DPF has a greater heat capacity than the DOC. Therefore, the change in the actual temperature of the DPF shown by a heavy line "c" in FIG. 22 is delayed compared to the change in the DOC temperature shown by the broken line "a" in FIG. 22. Therefore, the sensed temperature does not decrease quickly as shown by the thin line "b", and the DOC temperature further decreases as shown by the broken line "a" before the sensed temperature shown by the thin line "b" decreases. Even if the temperature increasing operation is resumed because of the decrease in the sensed temperature shown by the thin line "b" at the time point tB in FIG. 22, the low-temperature exhaust gas passing through the DOC flows into the DPF. Therefore, the decrease in the actual temperature of the DPF shown by the heavy line "c" does not stop immediately. The actual temperature of the DPF starts increasing after the DOC temperature shown by the broken line "a" becomes high as a result of the resumption of the temperature increasing operation.

If a state in which the DPF temperature is lower than a predetermined temperature (for instance, 450° C. or under) continues during the regeneration of the DPF, the regeneration of the DPF will be extended and the fuel consumption will be deteriorated. In order to avoid such a situation, the DPF temperature should be preferably increased quickly to the target temperature TT (500° C., for instance) and maintained near the target temperature TT in the regeneration of the DPF.

SUMMARY OF THE INVENTION

It is therefore an object of the present invention to provide an exhaust gas purification system capable of quickly increasing temperature of a diesel particulate filter and maintaining the temperature of the diesel particulate filter near target temperature when the diesel particulate filter is regenerated. Thus, damage to the diesel particulate filter or degradation of an oxidation catalyst due to high temperature can be prevented. Meanwhile, deterioration of fuel consumption can be inhibited. Thus, the exhaust gas purification system can perform the regeneration of the diesel particulate filter safely and efficiently.

According to an aspect of the present invention, an exhaust gas purification system of an internal combustion engine includes a particulate filter, temperature increasing means, particulate matter accumulation quantity estimating means and temperature increase controlling means. The particulate filter is disposed in an exhaust passage of the engine. The temperature increasing means increases temperature of the particulate filter. The particulate matter accumulation quantity estimating means estimates a quantity of particulate matters accumulated in the particulate filter (a particulate matter accumulation quantity). The temperature increase controlling means operates the temperature increasing means to increase the temperature of the particulate filter to target temperature when the particulate matter accumulation quantity, which is estimated by the particulate matter accumulation quantity estimating means, exceeds a predetermined value. Thus, the particulate matters accumulated in the particulate filter are combusted and eliminated.

The temperature increase controlling means includes first correcting means. The first correcting means estimates the temperature of the particulate filter based on information of the exhaust gas flowing into the particulate filter, an operating state of the engine and a manipulated variable of the temperature increasing means. Then, the first correcting means corrects the manipulated variable of the temperature increasing means based on a result of comparison between the estimated temperature and the target temperature.

The temperature increase controlling means operates the temperature increasing means so that the temperature of the particulate filter becomes target temperature (600° C., for instance) when the particulate matter accumulation quantity exceeds a predetermined value. At that time, through the correction performed by the first correcting means, the temperature of the particulate filter deviated from the target temperature by a disturbance and the like can be quickly returned to the target temperature. The first correcting means performs the correction based on the information related to an area upstream of the particulate filter. Therefore, an effect of the disturbance on the particulate filter can be detected in advance, and the change in the temperature of the particulate filter can be estimated in advance. Thus, the manipulated variable of the temperature increasing means can be corrected before the actually measured value changes, and response of temperature control can be improved. As a result, the deterioration of the fuel consumption can be inhibited and the safe and efficient regeneration can be performed.

According to another aspect of the present invention, the first correcting means divides the delay in the change of the temperature of the particulate filter with respect to convergence temperature T0 into dead time and an nth-order delay. Then, the first correcting means calculates the first temperature estimate in accordance with only the nth-order delay out of the dead time and the nth-order delay.

The temperature predicted by delaying the convergence temperature T0 by the nth-order delay indicates the temperature of the diesel particulate filter at a time point later than the present time by the dead time. The first temperature estimate is calculated based on the predicted temperature and is compared with the target temperature. Thus, the deficiency of the heat quantity caused in the future can be easily estimated. Therefore, the temperature control achieving excellent response can be performed by correcting the temperature increase manipulated variable so that the heat quantity corresponding to the deficiency is supplied.

According to yet another aspect of the present invention, the temperature increase controlling means includes target temperature setting means for changing the setting of the target temperature in accordance with the quantity of the particulate matters remaining in the particulate filter during the operation for increasing the temperature of the particulate filter.

When the temperature increase controlling means operates the temperature increasing means, the temperature increase controlling means changes the target temperature in accordance with the quantity of the remaining particulate matters during the temperature increase, and controls the manipulated variable in accordance with the target temperature. Thus, the controllability is improved and the safety is ensured. Meanwhile, the deterioration of the fuel consumption can be inhibited by improving the response.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
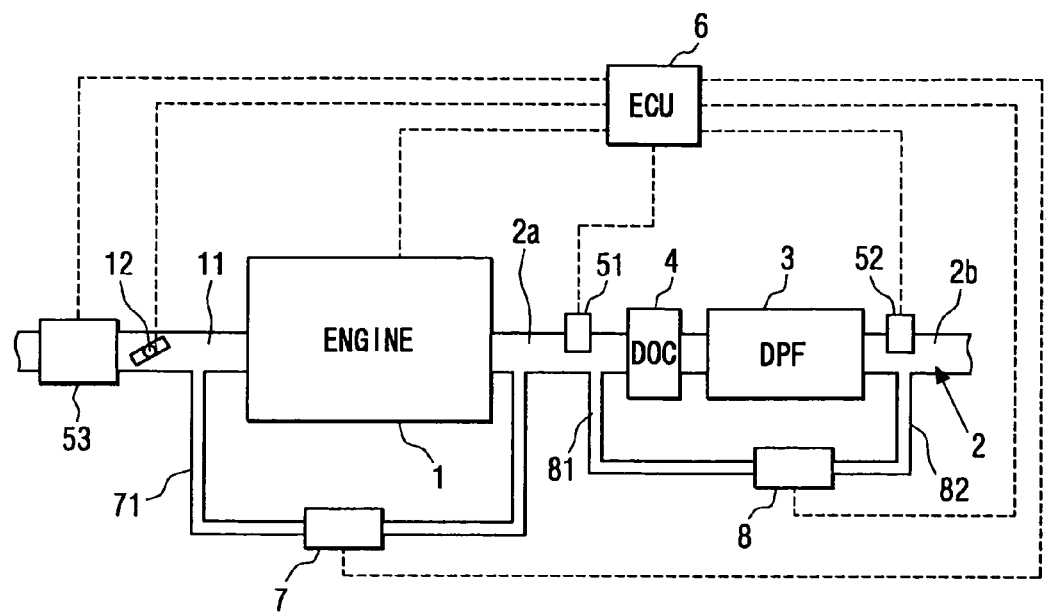
FIG. 1 is a schematic diagram showing an exhaust gas purification system of an internal combustion engine according to a first embodiment of the present invention.

Referring to FIG. 1, an exhaust gas purification system of a diesel engine according to a first embodiment of the present invention is illustrated. As shown in FIG. 1, a diesel particulate filter (a DPF, hereafter) 3 is disposed between exhaust pipes 2a, 2b, which provide an exhaust passage 2 of the diesel engine 1. An oxidation catalyst (a diesel oxidation catalyst: a DOC, hereafter) 4 is disposed in the exhaust pipe 2a upstream of the DPF 3. The DPF 3 is a ceramic filter having publicly known structure. For instance, the DPF 3 is formed of heat-resistant ceramic such as cordierite in the shape of honeycomb structure having a multiplicity of cells as gas passages provided by porous separation walls. An inlet or an outlet of each cell is blocked alternately. The exhaust gas discharged from the engine 1 flows downstream while passing through the porous separation walls of the DPF 3. At that time, particulate matters are collected and accumulated in the DPF 3 gradually.

The DOC 4 has publicly known structure, in which an oxidation catalyst is supported on a surface of a ceramic supporting member formed of a cordierite honeycomb structural body and the like. In order to increase the temperature of the DPF 3, the DOC 4 increases the temperature of the exhaust gas by combusting hydrocarbon (HC), which is supplied into the exhaust passage 2, through catalytic reaction. An oxidation catalyst may be supported on the DPF 3 or may not be supported on the DPF 3. System structure, which includes the DPF 3 supporting the oxidation catalyst but does not include the DOC 4, may be employed.

An exhaust gas temperature sensor 51 is disposed in the exhaust pipe 2a upstream of the DOC 4 and another exhaust gas temperature sensor 52 is disposed in the exhaust pipe 2b downstream of the DPF 3. The exhaust gas temperature sensors 51, 52 are connected to an electronic control unit (an ECU) 6 for sensing the temperature of the exhaust gas flowing into the DPF 3 and the temperature of the exhaust gas flowing out of the DPF 3 and for outputting the temperatures to the ECU 6 respectively. An airflow meter (an air intake quantity sensor) 53 is disposed in an air intake pipe 11 of the engine 1 for outputting the air intake quantity to the ECU 6. An air intake throttle valve 12 is disposed in the air intake pipe 11 downstream of the airflow meter 53 for increasing or decreasing the air intake quantity responsive to a command of the ECU 6. The air intake pipe 11 of the engine 1 communicates with the exhaust pipe 2a upstream of the DOC 4 through an EGR pipe 71 having an EGR valve 7. The EGR valve 7 increases or decreases an exhaust gas recirculation quantity (an EGR quantity) of the exhaust gas recirculated to the intake air responsive to the command of the ECU 6.

A pressure difference sensor 8 for sensing a pressure difference across the DPF 3 is connected to the exhaust pipes 2a, 2b in order to estimate a quantity of the particulate matters collected and accumulated in the DPF 3 (a particulate matter accumulation quantity MPM). One end of the pressure difference sensor 8 is connected to the exhaust pipe 2a upstream of the DPF 3 through a pressure introduction pipe 81, and the other end of the pressure difference sensor 8 is connected to the exhaust pipe 2b downstream of the DPF 3 through another pressure introduction pipe 82. Thus, the pressure difference sensor 8 outputs a signal corresponding to the pressure difference across the DPF 3 to the ECU 6.

Moreover, the ECU 6 is connected with various sensors such as an accelerator position sensor or an engine rotation speed sensor. The ECU 6 detects an operating state of the engine 1 based on the sensor signals outputted from the various sensors. The ECU 6 calculates an optimum fuel injection quantity, optimum injection timing, an optimum injection pressure and the like in accordance with the operating state of the engine 1 and controls the fuel injection to the engine 1. The ECU 6 controls regeneration of the DPF 3 based on the operating state of the engine 1 and the outputs of the above various sensors. In the regeneration of the DPF 3, post-injection or the like is performed to increase the temperature of the DPF 3 to target temperature. The ECU 6 controls the air intake quantity by regulating a valve opening degree of the air intake throttle valve 12 and controls the EGR quantity by regulating a valve opening degree of the EGR valve 7.

Next, regeneration control of the DPF 3 performed by the ECU 6 will be explained. The ECU 6 includes temperature increasing means for increasing the temperature of the DPF 3. The temperature increasing means increases the temperature of the DPF 3 by increasing the temperature of the exhaust gas. Meanwhile, the temperature increasing means increases the quantity of the hydrocarbon in the exhaust gas in order to increase the temperature of the DPF 3 with the use of reaction heat of the hydrocarbon, the reaction heat being generated at the DOC 4. The ECU 6 includes particulate matter accumulation quantity estimating means for estimating the particulate matter accumulation quantity MPM of the DPF 3. The ECU 6 includes temperature increase controlling means for operating the temperature increasing means to increase the temperature of the DPF 3 to target temperature when the particulate matter accumulation quantity MPM exceeds a predetermined value. Thus, the accumulated particulate matters are combusted and eliminated, and the DPF 3 is regenerated.

Figure 2:
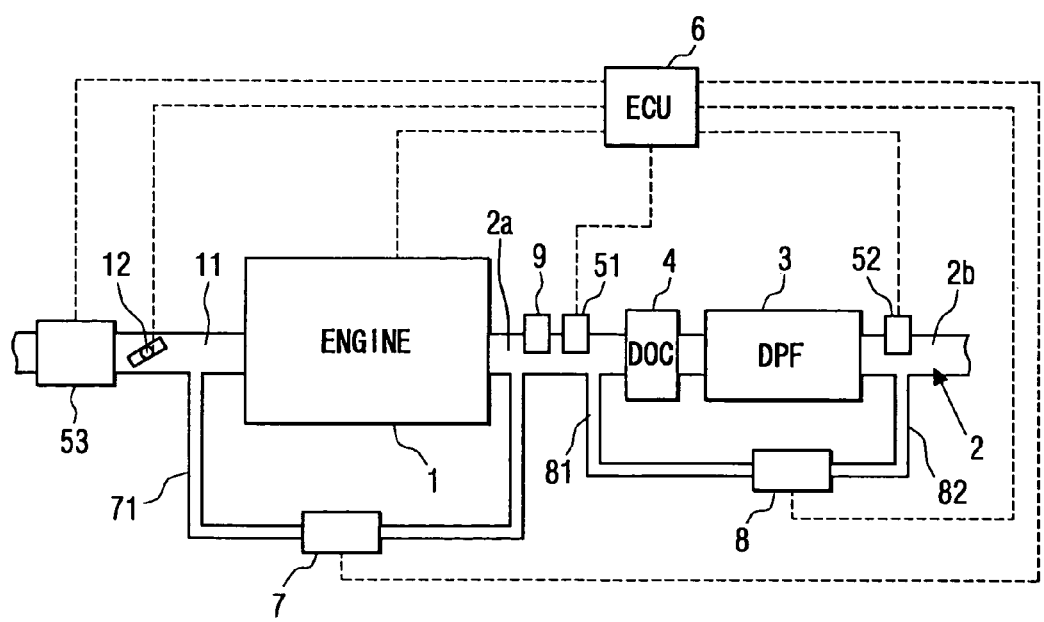
FIG. 2 is a schematic diagram showing another example of the exhaust gas purification system according to the first embodiment.

The temperature increasing means performs post-injection, retardation of the fuel injection timing, restriction of the intake air, an increasing operation of the EGR quantity and the like. Through these operations, unburned hydrocarbon is supplied to the exhaust passage 2 and generates heat through oxidation reaction at the DOC 4, or the temperature of the exhaust gas discharged from the engine 1 is increased. Thus, the high-temperature exhaust gas is supplied to the DPF 3. Alternatively, the hydrocarbon may be directly supplied from a fuel adding device 9 disposed in the exhaust pipe 2a upstream of the DOC 4 as shown in an example of another system structure shown in FIG. 2. The temperature increasing means may perform any one of the above operations or any combination of the above operations.

Figure 4:
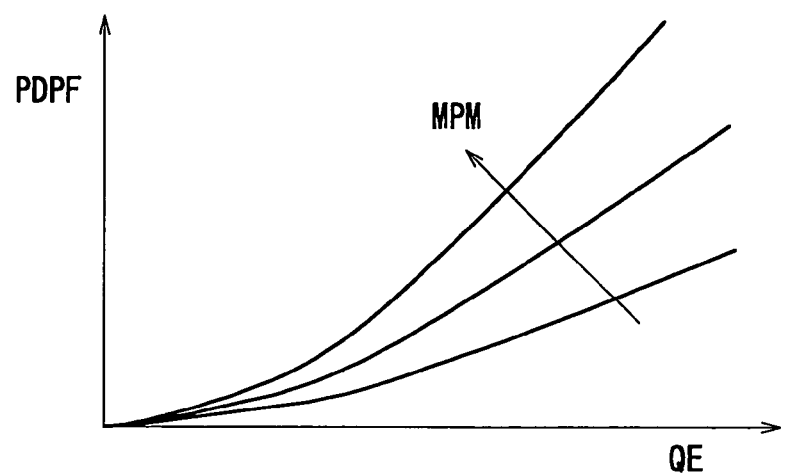
FIG. 4 is a graph showing a relationship between a pressure difference across a diesel particulate filter (a DPF) and a particulate matter accumulation quantity of the DPF according to the first embodiment.

The particulate matter accumulation quantity estimating means estimates the particulate matter accumulation quantity MPM from the pressure difference PDPF across the DPF 3 sensed by the pressure difference sensor 8, for instance. In FIG. 4 the particulate matter accumulation quantity MPM increases along an arrow mark "MPM". As shown by the arrow mark "MPM" in FIG. 4, the pressure difference PDPF across the DPF 3 increases as the particulate matter accumulation quantity MPM increases when the flow rate QE of the exhaust gas is the same. Therefore, the particulate matter accumulation quantity MPM can be calculated by obtaining the relationship in advance. Alternatively, the particulate matter accumulation quantity MPM may be estimated by calculating a discharged quantity of the particulate matters discharged from the engine 1 based on the operating state of the engine 1 detected through the outputs of the various sensors, and by integrating the discharged quantity of the particulate matters. The above estimating methods may be combined with each other.

Figure 3:
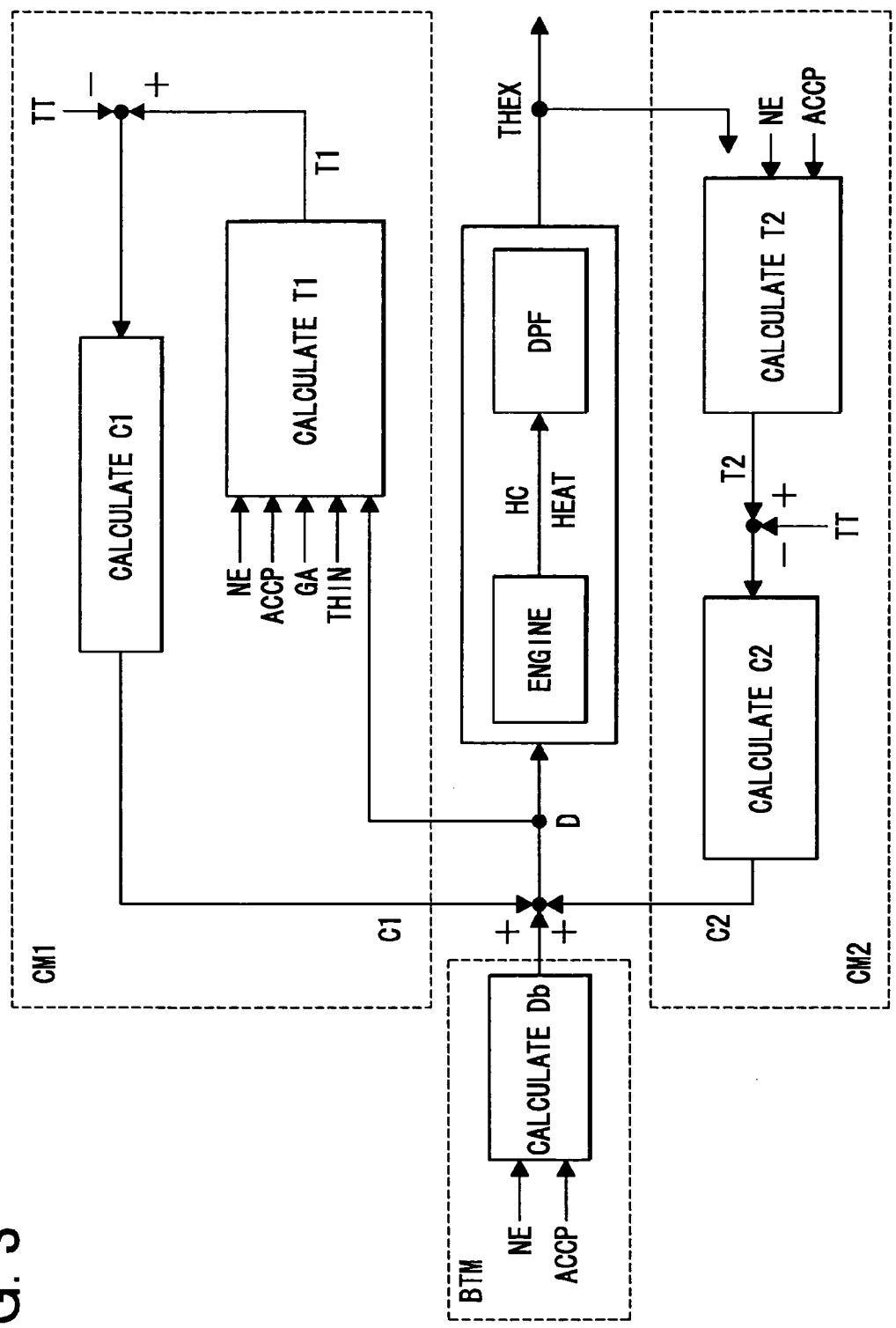
FIG. 3 is a block diagram showing a characteristic portion of regeneration control according to a first embodiment of the present invention.

The temperature increase controlling means of the ECU 6 of the first embodiment includes basic temperature increase manipulated variable calculating means shown by an area "BTM" in a block diagram of FIG. 3, first correcting means shown by an area "CM1" in FIG. 3 and second correcting means shown by an area "CM2" in FIG. 3. The basic temperature increase manipulated variable calculating means calculates a basic temperature increase manipulated variable Db of the temperature increasing means. The first and second correcting means correct the basic temperature increases manipulated variable Db. The basic temperature increase manipulated variable calculating means calculates the basic temperature increase manipulated variable Db for increasing the temperature of the DPF 3 to the target temperature TT based on the operating state of the engine 1 such as engine rotation speed NE or an accelerator position ACCP sensed by the above various sensors. The first correcting means calculates a first correction value C1 based on information related to an area upstream of the DPF 3. The second correcting means calculates a second correction value C2 based on information related to an area downstream of the DPF 3. The temperature increasing means is operated based on a temperature increase manipulated variable D, which is calculated by correcting the basic temperature increase manipulated variable Db with the first and second correction values C1, C2. Thus, the DPF temperature is controlled.

In the present embodiment, the target temperature TT is set to a predetermined constant value (600° C., for instance). The basic temperature increase manipulated variable Db is set to a certain value, at which the temperature of the DPF 3 reaches the target temperature TT when the temperature increasing operation is performed for a sufficient time length in each operating state. The basic temperature increase manipulated variable calculating means stores the basic temperature increase manipulated variable Db in the form of a map based on the engine rotation speed NE and the accelerator position ACCP.

Alternatively, the target temperature TT may be changed in accordance with a quantity of the particulate matters remaining in the DPF 3 during the temperature increasing operation. In this case, the basic temperature increase manipulated variable calculating means includes target temperature setting means. The target temperature setting means changes the setting of the target temperature TT based on the quantity of the remaining particulate matters (the particulate matter accumulation quantity MPM) when the basic temperature increase manipulated variable Db is calculated. The target temperature setting means sets the target temperature to a greater value as the quantity of the remaining particulate matters decreases. For instance, when the weight of the remaining particulate matters is greater than 4 grams, the target temperature TT is set to 600° C. When the weight of the remaining particulate matters is equal to or less than 4 grams, the target temperature TT is set to 650° C., for instance. Alternatively, the target temperature TT may be set in multiple steps.

In the case where a large amount of the particulate matters is accumulated in the DPF 3, the DPF temperature will increase excessively if the particulate matters are combusted rapidly. As a result, the oxidation catalyst or the DPF 3 will be damaged. Therefore, in such a case where a large amount of the particulate matters is accumulated in the DPF 3, the target temperature TT is set to low temperature from the viewpoint of the safety. When a small amount of the particulate matters is accumulated, the DPF temperature will not increase excessively. In such a case, the target temperature TT is set to high temperature in order to combust and eliminate the accumulated particulate matters in a short time without deteriorating the fuel consumption. Thus, safe regeneration of the DPF 3 and the inhibition of the deterioration of the fuel consumption can be achieved at the same time by changing the target temperature TT in accordance with the quantity of the remaining particulate matters.

Figure 5:
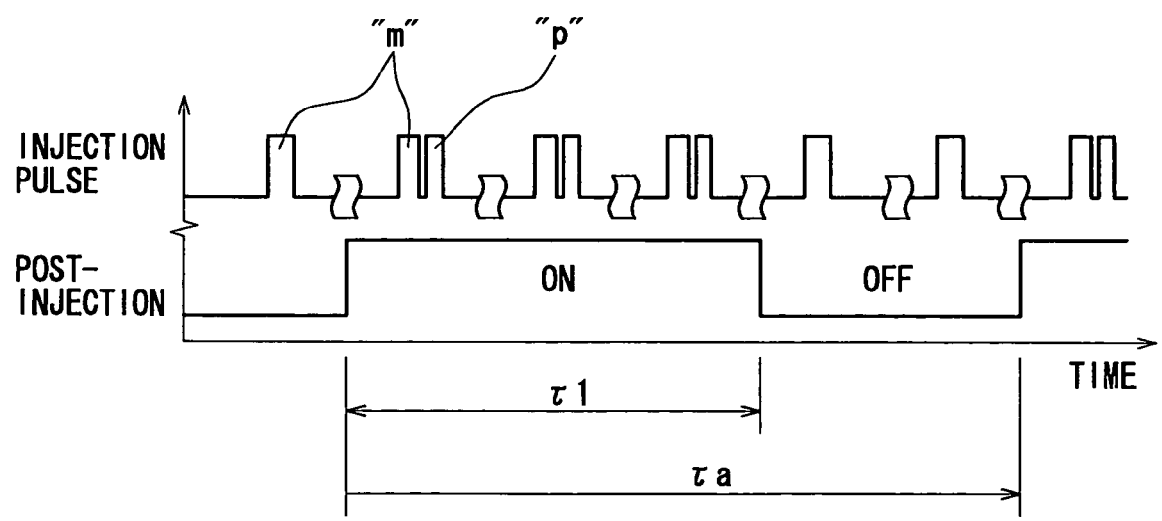
FIG. 5 is a time chart showing an operating method of temperature increasing means according to the first embodiment.
Figure 6:
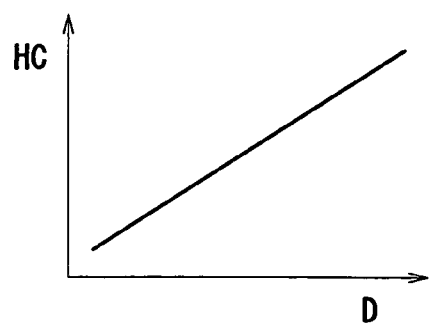
FIG. 6 is a graph showing a relationship between a temperature increase manipulated variable and a quantity of hydrocarbon discharged from the engine according to the first embodiment.
Figure 7:
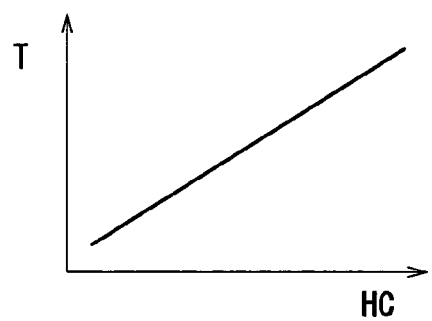
FIG. 7 is a graph showing a relationship between the quantity of the hydrocarbon discharged from the engine and temperature of the DPF according to the first embodiment.
Figure 8:
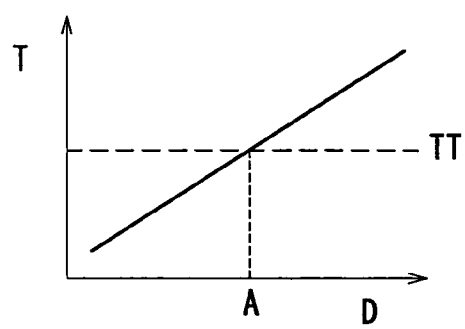
FIG. 8 is a graph showing a relationship between the temperature increase manipulated variable and the temperature of the DPF according to the first embodiment.

In the present embodiment, a period ratio (a temperature increase duty ratio D, hereafter) between the operated state and the stopped state of the temperature increasing means, which performs the post-injection (or the retardation of the injection timing and the like), is employed as the temperature increase manipulated variable D. In the case where the temperature increasing means performs the post-injection, a small amount of the fuel is additionally injected after a main injection, which is performed to operate the engine 1, as shown in FIG. 5. In FIG. 5, a projection "m" represents an injection pulse for the main injection, and another projection "p" is an injection pulse for the post-injection. The temperature increase manipulated variable (the temperature increase duty ratio) D is expressed by a following equation: $D=\tau1/\tau a$, where $\tau1$ represents a period in which the temperature increasing operation (the post-injection) is performed in a predetermined repeating cycle $\tau a$. The repeating cycle $\tau a$ may be provided by a constant period (one second, for instance) or by a period synchronized with the engine rotation speed NE. The quantity (HC) of the hydrocarbon discharged from the engine 1 is increased or decreased by changing the temperature increase duty ratio D as the temperature increase manipulated variable as shown in FIG. 6. Thus, the DPF temperature T can be controlled as shown in FIG. 7. More specifically, the DPF temperature T is increased by increasing the temperature increase duty ratio D, and the DPF temperature T is decreased by decreasing the temperature increase duty ratio D as shown in FIG. 8. Based on the relationship, the basic temperature increase manipulated variable Db is set to a certain temperature increase duty ratio "A" in FIG. 8, at which the DPF temperature T conforms to the target temperature TT.

Alternatively, the temperature increase manipulated variable D may be provided in the form of the post-injection quantity (or the retarding degree of the injection timing and the like). In this case too, the post-injection quantity (or the retarding degree of the injection timing and the like), the quantity of the hydrocarbon discharged from the engine 1 and the DPF temperature T have the similar relationships. The DPF temperature T is increased by increasing the post-injection quantity, and the DPF temperature T is decreased by decreasing the post-injection quantity.

Figure 9:
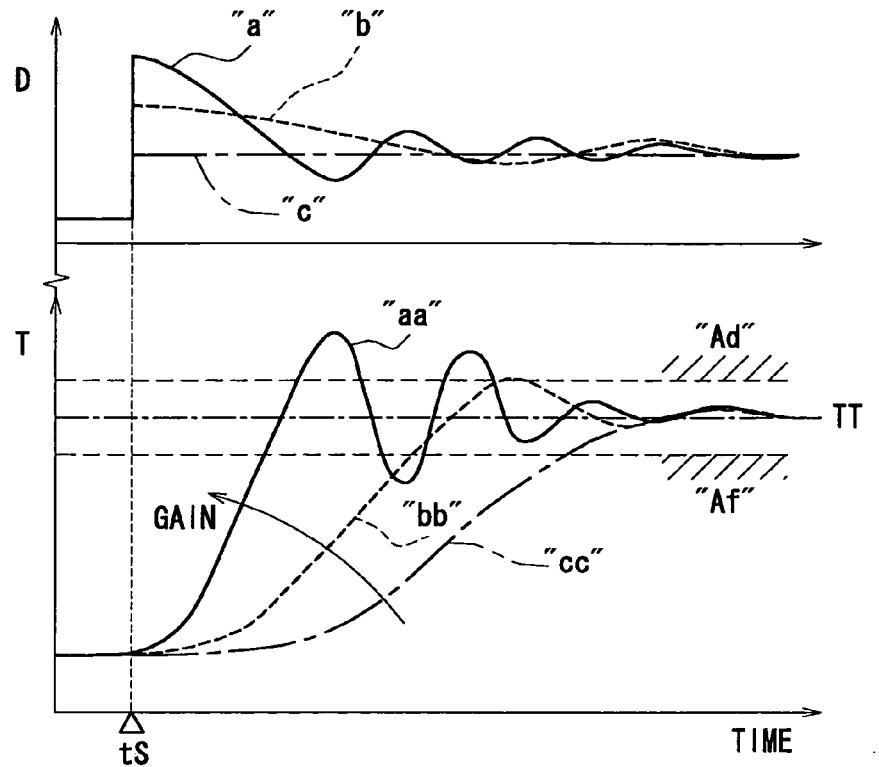
FIG. 9 is a time chart showing an effect of a feedback gain in feedback control of the temperature of the DPF according to the first embodiment.
Figure 10:
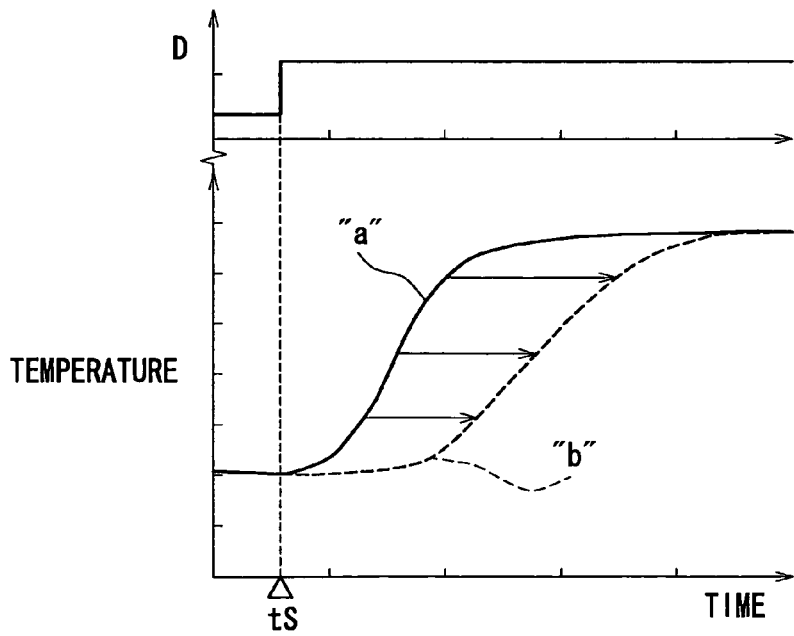
FIG. 10 is a time chart showing changes in the temperature of the DPF and DPF outlet exhaust gas temperature with respect to a change in the temperature increase manipulated variable according to the first embodiment.

In the case where the regeneration control is performed solely based on the basic temperature increase manipulated variable Db, the DPF temperature T can be easily deviated from the target temperature TT if a disturbance such as a change in the operating state of the engine 1 is caused. In order to quickly return the deviated DPF temperature T to the target temperature TT, the basic temperature increase manipulated variable Db, or the temperature increase manipulated variable D, should be preferably corrected. In order to prevent excessive correction, the correction value should be preferably calculated based on information about the DPF temperature T. However, if the temperature increase manipulated variable D is feedback-controlled as shown by a solid line "a" in FIG. 9 based on DPF outlet exhaust gas temperature (the temperature of the exhaust gas flowing out of the DPF 3), which well reflects the DPF temperature T and can be measured actually, and if a feedback gain is increased excessively to improve the response, the DPF temperature T will become unstable as shown by a solid line "aa". The feedback gain increases along an arrow mark "GAIN" in FIG. 9. The temperature increasing operation is started at a time point "tS" in FIG. 9. As a result, the DPF temperature T will be increased excessively and the fuel consumption will be deteriorated. In FIG. 9, an area "Af" represents an area where the fuel consumption can be deteriorated and another area "Ad" represents an area where the damage to the DPF 3 or the degradation of the catalyst can be caused. In FIG. 9, the changes of the DPF temperature T shown by a broken line "bb" and a chain line "cc" correspond to the temperature increase manipulated variables D shown by a broken line "b" and a chain line "c" respectively. The DPF temperature T is changed by the disturbance such as the change in the operating state of the engine 1, but the change in the DPF temperature T is relatively slow because the DPF 3 has a relatively large heat capacity. Therefore, there is a large time-lag between the time when the disturbance is caused and the time when the effect of the disturbance is reflected in the DPF outlet exhaust gas temperature. As a result, the above phenomenon is caused. For the same reason, there is a time-lag between the change of the central temperature of the DPF shown by a solid line "a" in FIG. 10 and the change of the DPF outlet exhaust gas temperature shown by a broken line "b" in FIG. 10 when the temperature increase manipulated variable (for instance, the temperature increase duty ratio) D is changed at a time point tS. Arrow marks in FIG. 10 represent the time-lag of the DPF outlet exhaust gas temperature with respect to the central temperature of the DPF 3. Therefore, the control achieving quick response cannot be performed through the feedback control of the DPF outlet exhaust gas temperature alone.

Figure 11:
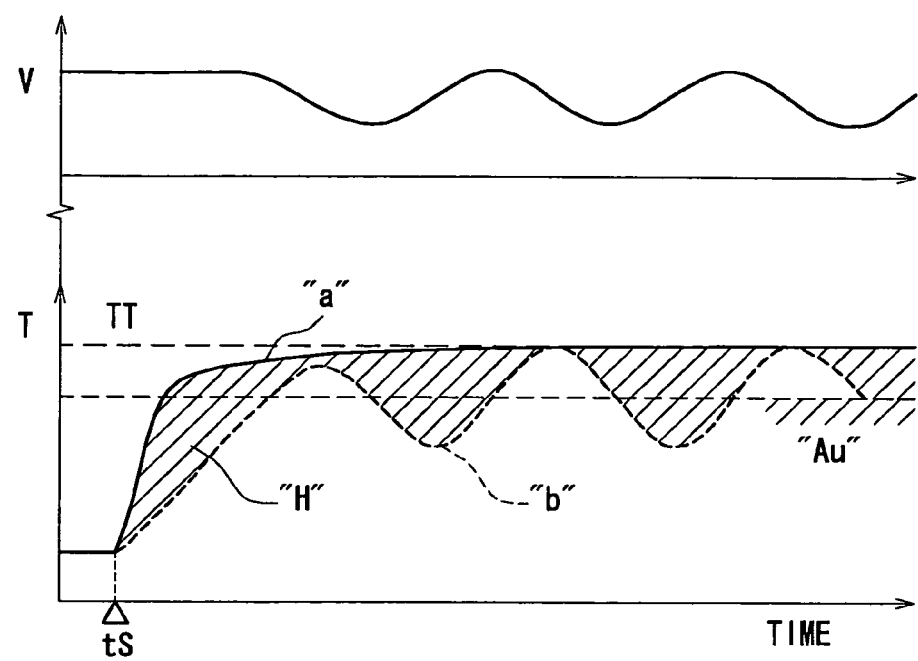
FIG. 11 is a time chart showing en effect of the correction of the temperature increase manipulated variable according to the first embodiment.
Figure 12:
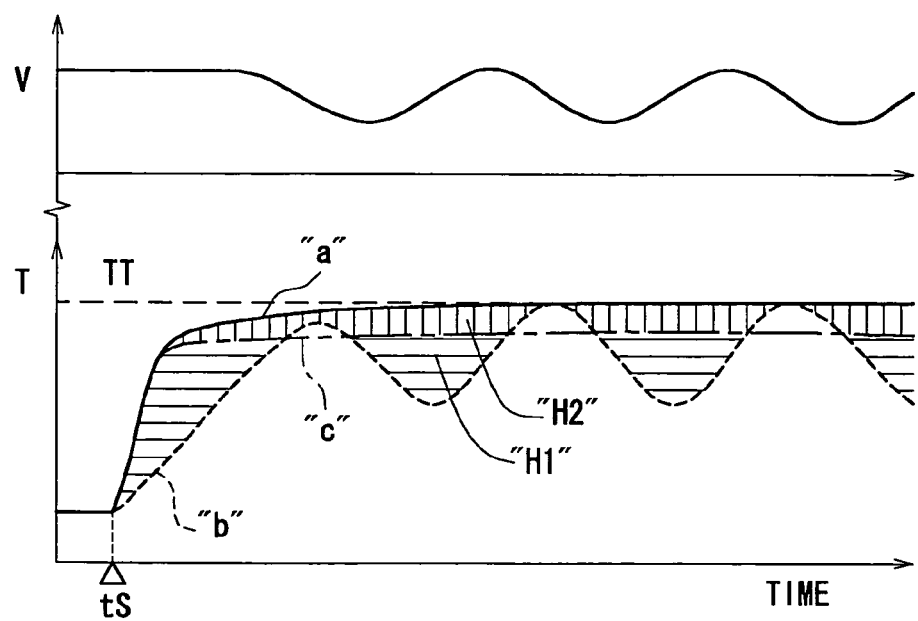
FIG. 12 is a time chart showing an effect of correction of the temperature increase manipulated variable performed by first and second correcting means according to the first embodiment.

Therefore, in the present embodiment, as shown in FIG. 11, if the DPF temperature T deviates from the target temperature TT because of the change in the operating state and the like, an excess or deficiency (subsidiary supply heat) of the heat quantity actually supplied to the DPF 3 with respect to the heat quantity required to maintain the target temperature TT is calculated. In FIG. 11, "V" represents velocity of a vehicle. Then, the heat quantity to be supplied is corrected in accordance with the calculated subsidiary supply heat in order to accurately maintain the DPF temperature T near the target temperature TT. A broken line "b" in FIG. 11 represents the DPF temperature T in the conventional exhaust gas purification system, or the DPF temperature T before the supplied heat quantity is corrected, and a solid line "a" is the DPF temperature T after the supplied heat quantity is corrected in the present embodiment. An area "H" in FIG. 11 represents the subsidiary supply heat, and an area "Au" is an operating area where the particulate matters accumulated in the DPF 3 cannot be combusted. The correction based on the subsidiary supply heat includes first correction, which is performed by the first correcting means based on the information related to an area upstream of the DPF 3, and second correction, which is performed by the second correcting means based on the information related to an area downstream of the DPF 3 as shown in FIG. 12. A broken line "b" in FIG. 12 represents the DPF temperature T before the first and second corrections are performed. The first correction performed by the first correcting means based on the information related to the area upstream of the DPF 3 inhibits fluctuation of the DPF temperature T due to the change in the operating state. After the first correction is performed, the DPF temperature T is increased toward the target temperature TT quickly in the beginning of the temperature increasing operation as shown by a chain line "c" in FIG. 12. Then, the second correction performed by the second correcting means based on the information related to the area downstream of the DPF 3 reduces steady deviation of the DPF temperature T from the target temperature TT as shown by a solid line "a" in FIG. 12. An area "H1" in FIG. 12 represents the subsidiary supply heat supplied in the first correction, and another area "H2" represents the subsidiary supply heat supplied in the second correction.

As shown in FIG. 3, the first correcting means includes first temperature estimate calculating means and first correction value calculating means. The first temperature estimate calculating means estimates the temperature of the DPF 3 based on the information related to the area upstream of the DPF 3 including a state of the exhaust gas flowing into the DPF 3, the engine operating state and the temperature increase manipulated variable D of the temperature increasing means. The first correction value calculating means calculates the first correction value C1 based on a result of comparison between the estimated temperature (the first temperature estimate T1) and the target temperature TT. The state of the exhaust gas flowing into the DPF 3 includes the flow rate and the temperature of the exhaust gas upstream of the DPF 3. The engine operating state includes the engine rotation speed NE and the accelerator position ACCP or the fuel injection quantity. More specifically, the first temperature estimate calculating means calculates convergence temperature T0 first, based on the state of the exhaust gas flowing into the DPF 3, the engine operating state and the temperature increase manipulated variable D of the temperature increasing means. The convergence temperature T0 is temperature to which the DPF temperature T will eventually converge if the present state of the exhaust gas flowing into the DPF 3, the present engine operating state and the present temperature increase manipulated variable D of the temperature increasing means are maintained for a long time. It is determined that the present state of the exhaust gas flowing into the DPF 3, the present engine operating state and the present temperature increase manipulated variable D of the temperature increasing means are maintained for a ling time if substantially the same state in which the fluctuation is within a predetermined range is maintained for a sufficiently long time. Therefore, some fluctuation is permitted. Then, the first temperature estimate T1 is calculated by estimating the change from the present temperature to the convergence temperature T0 in consideration of the delay in the temperature change due to the heat capacity of the DPF 3.

More specifically, the first temperature estimate calculating means calculates the first temperature estimate T1 based on the engine rotation speed NE, the accelerator position ACCP or the fuel injection quantity, the air intake quantity GA, the temperature increase manipulated variable D and the temperature of the exhaust gas upstream of the DPF 3. The temperature of the DPF 3 is determined mainly by the balance between the heat generation through the oxidation reaction of the hydrocarbon and the heat radiation into the exhaust gas. The change in the temperature is delayed because of the heat capacity of the DPF 3. Therefore, the DPF temperature T can be calculated from the quantity of the hydrocarbon discharged from the engine 1 and the temperature and the flow rate of the exhaust gas upstream of the DPF 3. The quantity of the hydrocarbon discharged from the engine 1 can be calculated based on the operating state of the engine 1 (for instance, the engine rotation speed NE and the accelerator position ACCP or the injection quantity) and the temperature increase manipulated variable D. The flow rate of the exhaust gas can be calculated based on the air intake quantity GA.

The first correction value calculating means performs correction based on the deviation of the DPF temperature estimate (the first temperature estimate T1), which is calculated from the information related to the area upstream of the DPF 3, from the target temperature TT through publicly known PID control, for instance. Alternatively, the first correction value calculating means may perform the correction based on state quantities in order to perform the correction achieving better response. The first correction value C1 is calculated so that the manipulated variable D of the temperature increasing means is increased or decreased in accordance with the difference between the first temperature estimate T1 and the target temperature TT. More specifically, the first correction value C1 is calculated so that a correction value (an absolute value) of the manipulated variable D of the temperature increasing means increases as the difference (the absolute value) between the first temperature estimate T1 and the target temperature TT increases. Thus, the rapid change in the DPF temperature T due to the disturbance can be detected and corrected in advance.

The first correcting means corrects the temperature increase manipulated variable D by using the first temperature estimate T1 (the temperature estimated from the information related to the area upstream of the DPF 3 in advance) before the actual value (for instance, the temperature of the exhaust gas downstream of the DPF 3) changes. Thus, the response of the temperature control of the DPF 3 is improved. More specifically, at the time point when the disturbance is caused, the correction for estimating the effect of the disturbance on the DPF temperature T is performed. As a result, the temperature control achieving the quick response can be performed.

However, if the first correcting means, which performs the correction based on the information related to the area upstream of the DPF 3, is employed alone, the temperature is controlled based on the estimate of the DPF temperature (the first temperature estimate T1) alone. In this case, there is a possibility that an error is caused and the control accuracy is deteriorated. The error is caused by the change of the catalytic performance with time or variation in the components such as the various sensors, for instance. Therefore, preferably, the second correction should be performed by the second correcting means based on the information related to the area downstream of the DPF 3 (the information about the exhaust gas discharged from the DPF 3) reflecting the actual DPF temperature, in addition to the first correction performed by the first correcting means.

The second correcting means includes second temperature estimate calculating means and second correction value calculating means. The second temperature estimate calculating means estimates the temperature of the DPF 3 (a second temperature estimate T2) based on the information about the exhaust gas discharged from the DPF 3. The second correction value calculating means calculates a second correction value C2 based on the comparison between the estimated temperature (the second temperature estimate T2) and the target temperature TT. More specifically, the information about the exhaust gas discharged from the DPF 3 is the temperature of the exhaust gas discharged from the DPF 3. Alternatively, the DPF temperature may be estimated based on the temperature of the exhaust gas discharged from the DPF 3 and the temperature of the exhaust gas flowing into the DPF 3.

The second temperature estimate calculating means calculates the second temperature estimate T2 by correcting the temperature of the exhaust gas downstream of the DPF 3 based on the engine operating state (for instance, the engine rotation speed NE and the accelerator position ACCP or the fuel injection quantity). Alternatively, the second temperature estimate calculating means may calculate the second temperature estimate T2 by correcting the delay based on the temperature of the exhaust gas downstream of the DPF 3. More specifically, the second temperature estimate calculating means obtains a transfer function of the change of the temperature of the exhaust gas discharged from the DPF 3 with respect to the change of the temperature of the DPF 3 and estimates the temperature of the DPF 3 with the use of an inverse function of the transfer function. Alternatively, the second temperature estimate calculating means may calculate the second temperature estimate T2 based on the temperature of the exhaust gas flowing into the DPF 3 and the temperature of the exhaust gas flowing out of the DPF 3.

The second correction value calculating means performs the correction based on the deviation of the DPF temperature estimate (the second temperature estimate T2), which is calculated from the information related to the area downstream of the DPF 3, from the target temperature TT through PI control, for instance. The second correction value calculating means may perform correction based on the state quantities in order to perform the correction achieving the better response. More specifically, the second correction value C2 is calculated so that the manipulated variable D of the temperature increasing means is increased or decreased in accordance with the difference between the estimated second temperature estimate T2 and the target temperature TT. More specifically, the second correction value C2 is calculated so that a correction value (an absolute value) of the manipulated variable D of the temperature increasing means is increased as the difference (the absolute value) between the second temperature estimate T2 and the target temperature TT increases.

Figure 13:
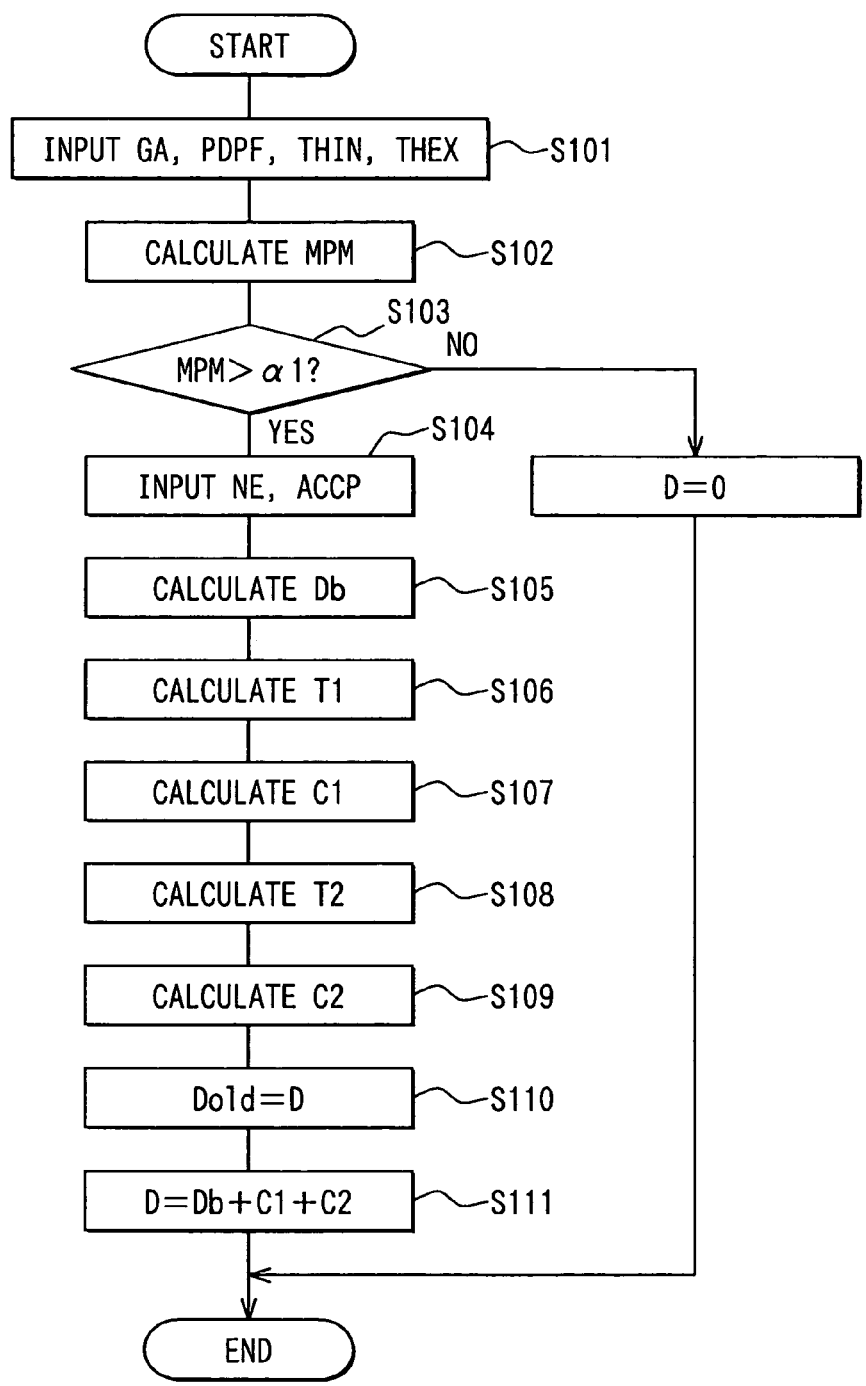
FIG. 13 is a flowchart showing the regeneration control performed by an electronic control unit (ECU) according to the first embodiment.

Next, the regeneration control of the present embodiment will be explained based on a flowchart shown in FIG. 13. First, in Step S101, the air intake quantity GA sensed by the airflow meter 53 and the pressure difference PDPF across the DPF 3 sensed by the pressure difference sensor 8 are inputted into the ECU 6. Meanwhile, in Step S101, an output of the exhaust gas temperature sensor 51 disposed upstream of the DPF 3 (an upstream exhaust gas temperature sensor output THIN) and an output of the exhaust gas temperature sensor 52 disposed downstream of the DPF 3 (a downstream exhaust gas temperature sensor output THEX) are respectively inputted into the ECU 6. Then, in Step S102, the flow rate QE of the exhaust gas passing through the DPF 3 is calculated from the air intake quantity GA and the downstream exhaust gas temperature sensor output THEX. Meanwhile, in Step S102, the particulate matter accumulation quantity MPM of the particulate matters accumulated in the DPF 3 is calculated from the exhaust gas flow rate QE and the pressure difference PDPF across the DPF 3. The relationship between the particulate matter accumulation quantity MPM and the pressure difference PDPF across the DPF 3 with respect to the exhaust gas flow rate QE is shown in FIG. 4. The particulate matter accumulation quantity MPM can be calculated based on the relationship shown in FIG. 4.

Then, in Step S103, it is determined whether the regeneration of the DPF 3 is necessary or not by comparing the calculated particulate matter accumulation quantity MPM with a predetermined value $\alpha 1$ (3 g/L, for instance). If the particulate matter accumulation quantity MPM is greater than the predetermined value $\alpha 1$, it is determined that the regeneration of the DPF 3 is necessary, and the temperature increasing operation of the DPF 3 is performed with the temperature increasing means. The temperature increasing means performs the post-injection, for instance. In steps following Step S103, the basic temperature increase duty ratio Db (the basic temperature increase manipulated variable Db) is calculated and corrected. If the particulate matter accumulation quantity MPM is equal to or less than the predetermined value $\alpha 1$, the temperature increase duty ratio D is set to 0% and the control is ended without performing the temperature increasing operation.

Then, in Step S104, the engine rotation speed NE and the accelerator position ACCP are inputted into the ECU 6. Then, in Step S105, basic temperature increase manipulated variable calculating means included in the ECU 6 calculates the basic temperature increase duty ratio Db based on the engine rotation speed NE and the accelerator position ACCP. For instance, the basic temperature increase duty ratio Db is set to a temperature increase duty ratio "A" shown in FIG. 8, which brings the DPF temperature T to a predetermined constant value as the target temperature TT (650° C., for instance) of the regeneration in each operating state.

Then, in Step S106, the DPF temperature T is estimated based on the information related to the area upstream of the DPF 3. More specifically, in Step S106, the first temperature estimate calculating means calculates the first temperature estimate T1 based on the engine rotation speed NE, the accelerator position ACCP, a previous temperature increase duty ratio Dold calculated in previous time, the air intake quantity GA and the upstream exhaust gas temperature sensor output THIN. For instance, the quantity of the hydrocarbon discharged from the engine 1 is calculated based on the engine rotation speed NE, the accelerator position ACCP and the previous temperature increase duty ratio Dold. Subsequently, the first temperature estimate T1 is calculated from the temperature of the DPF 3, which is achieved by the reaction heat generated from the hydrocarbon, and the upstream exhaust gas temperature sensor output THIN. At that time, the heat transfer between the DPF 3 and the exhaust gas is changed in accordance with the flow rate of the exhaust gas passing through the DPF 3. Therefore, the heat radiated to the exhaust gas is calculated based on the flow rate of the exhaust gas, which is calculated based on the air intake quantity GA.

Then, in Step S107, the first correction value calculating means calculates the deviation E1 of the first temperature estimate T1 from the target temperature (650° C., for instance) and calculates the first correction value C1 in accordance with the deviation E1. For instance, the first correction value C1 is calculated in accordance with the deviation E1, an integrated value of the deviation E1 and the change of the deviation E1 per unit time as shown by a following formula (1). In the formula (1), KP1, KI1 and KD represent correction gains.

$$C1 = KP1 \times E1 + KI1 \times \Sigma E1 + KD \times \Delta E1/\Delta t, \tag{1}$$

Then, in Step S108, the DPF temperature T is estimated based on the information related to the area downstream of the DPF 3. More specifically, the second temperature estimate calculating means calculates the second temperature estimate T2 based on the engine rotation speed NE and the downstream exhaust gas temperature sensor output THEX.

For instance, the second temperature estimate T2 (the DPF temperature estimate) is calculated by correcting the downstream exhaust gas temperature sensor output THEX in accordance with the engine rotation speed NE and the accelerator position ACCP. For instance, correction values used in the above correction are stored in the form of the map based on the engine rotation speed NE and the accelerator position ACCP. Alternatively, the second temperature estimate T2 may be calculated through an inverse function of a transfer function, which is obtained based on a relationship between the change of the DPF temperature and the change of the exhaust gas temperature.

Then, in Step S109, a deviation E2 of the second temperature estimate T2 from the target temperature (650° C., for instance) is calculated and the second correction value C2 is calculated in accordance with the deviation E2. For instance, the second correction value C2 is calculated based on the deviation E2 and an integrated value of the deviation E2 as shown by a following formula (2). In the formula (2), KP2 and KI2 represent correction gains.

$$C2 = KP2 \times E2 + KI2 \times \Sigma E2, \qquad (2)$$

Then, in Step S110, the temperature increase duty ratio D calculated in previous time is stored in the memory as the previous temperature increase duty ratio Dold. Then, in Step S111, the temperature increase duty ratio D is calculated by correcting the basic temperature increase duty ratio Db calculated in Step S105 with the first correction value C1 calculated in Step S107 and the second correction value C2 calculated in Step S109, or by adding the first and second correction values C1, C2 to the basic temperature increase duty ratio Db.

Figure 14:
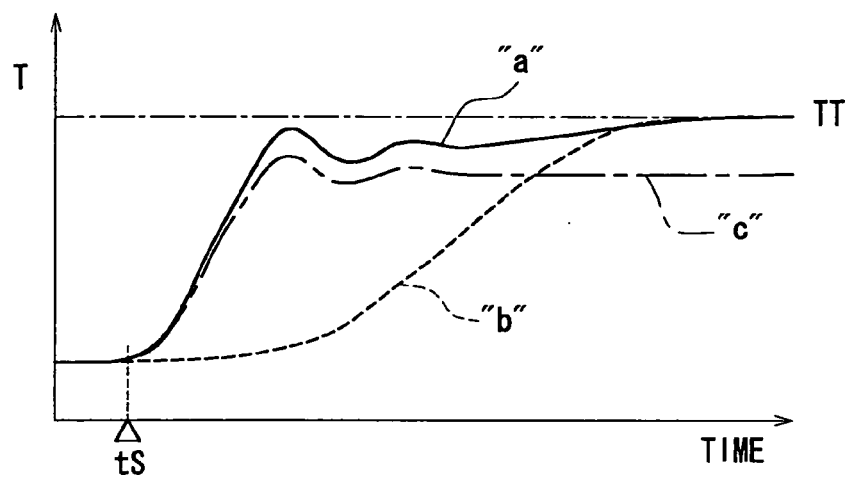
FIG. 14 is a time chart showing an effect of the temperature control of the DPF according to the first embodiment.

Thus, the deviation of the DPF temperature T from the target temperature TT can be inhibited by operating the temperature increasing means with the temperature increase duty ratio D corrected based on the information related to the areas upstream and downstream of the DPF 3. An effect of the temperature control of the present embodiment is shown in FIG. 14. In the case where the first correction is performed by the first correcting means through feed forward control, the DPF temperature T quickly increases to the proximity of the target temperature TT as shown by a chain line "c" after the temperature increasing operation is started at a time point tS in FIG. 14, compared to the case where the temperature increase manipulated variable D is not corrected. A broken line "b" in FIG. 14 shows the DPF temperature T in the case where the temperature increase manipulated variable D is not corrected. Further, the second correction performed by the second correcting means through the feedback control achieves quick response and high control accuracy by maintaining the DPF temperature T near the target temperature TT as shown by a solid line "a" in FIG. 14.

As explained above, the first correction performed by the first correcting means through the feed forward control is combined with the second correction performed by the second correcting means through the feedback control in the temperature control. Thus, the response to the rapid temperature change due to the disturbance and the like and the accuracy can be achieved in the temperature control at the same time. Accordingly, the degradation of the oxidation catalyst and the damage to the DPF 3 can be inhibited and the deterioration of the fuel consumption, which occurs when the hydrocarbon cannot be combusted, can be inhibited. As a result, the safe and efficient regeneration control of the DPF 3 can be performed.

Second Embodiment

Figure 15:
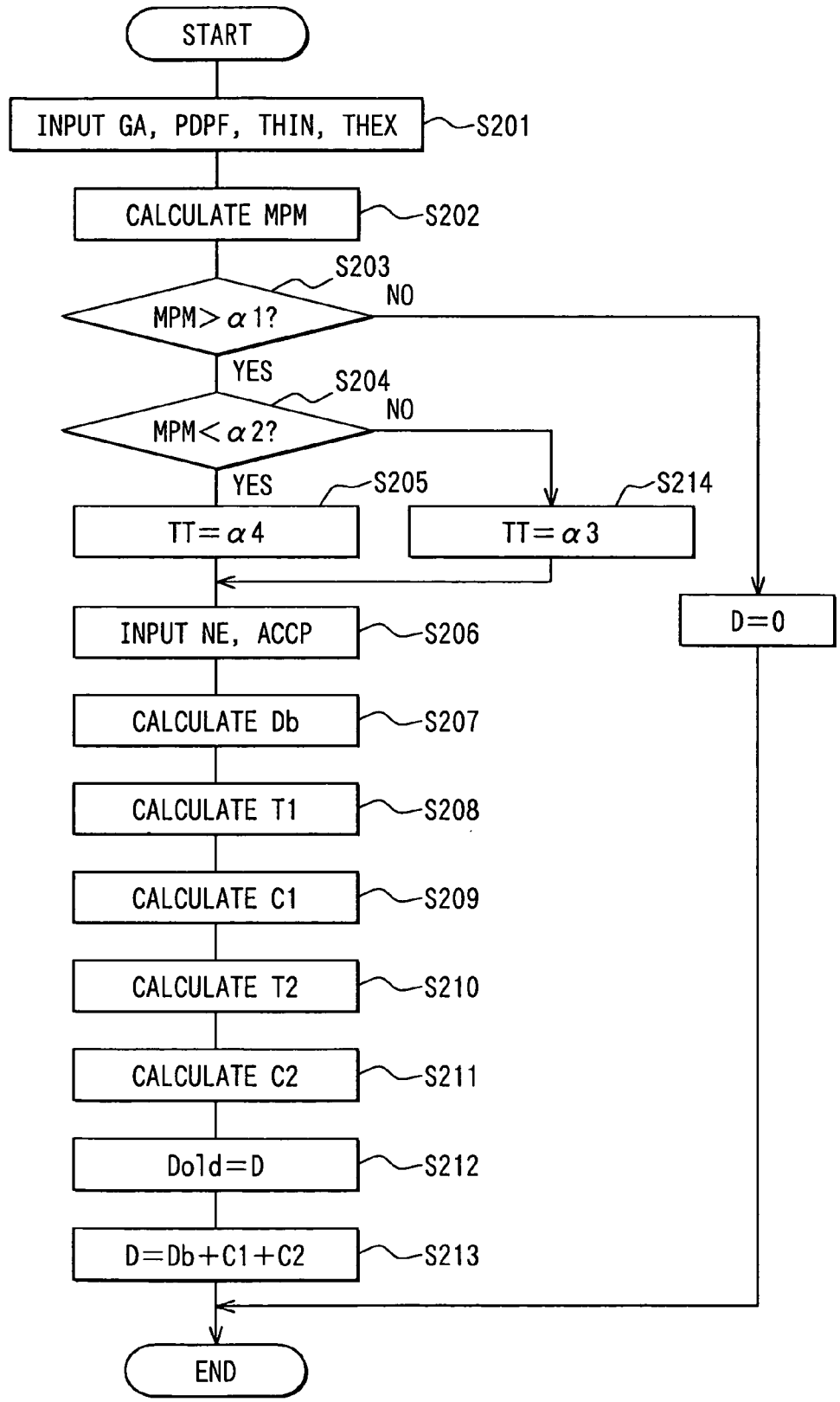
FIG. 15 is a flowchart showing regeneration control performed by an ECU according to a second embodiment of the present invention.

Next, regeneration control of the DPF 3 performed by the ECU 6 according to a second embodiment of the present invention will be explained based on a flowchart shown in FIG. 15. Structure of the exhaust gas purification system and a block diagram of a characteristic portion of the DPF regeneration control of the second embodiment are the same as those of the first embodiment. In the second embodiment, target temperature setting means changes the setting of the target temperature TT of the DPF 3 in accordance with the particulate matter accumulation quantity MPM, unlike the first embodiment.

First, in Step S201, the air intake quantity GA, the pressure difference PDPF across the DPF 3, the upstream exhaust gas temperature sensor output THIN and the downstream exhaust gas temperature sensor output THEX are inputted into the ECU 6. Then, in Step S202, the particulate matter accumulation quantity MPM of the DPF 3 is calculated based on the exhaust gas flow rate QE, which is calculated based on the air intake quantity GA and the downstream exhaust gas temperature sensor output THEX, and the pressure difference PDPF across the DPF 3.

Then, in Step S203, it is determined whether the regeneration of the DPF 3 is necessary or not by comparing the calculated particulate matter accumulation quantity MPM with a predetermined value $\alpha 1$ (2 g/L, for instance). If the particulate matter accumulation quantity MPM is greater than the predetermined value $\alpha 1$, it is determined that the regeneration of the DPF 3 is necessary, and the control proceeds to Step S204. If the particulate matter accumulation quantity MPM is equal to or less than the predetermined value $\alpha 1$, the temperature increase duty ratio D is set to 0% and the control is ended without performing the temperature increasing operation.

In Step S204, the calculated particulate matter accumulation quantity MPM is compared with a predetermined value $\alpha 2$ (3 g/L, for instance). The predetermined value $\alpha 2$ is greater than the predetermined value $\alpha 1$. If the particulate matter accumulation quantity MPM is equal to or greater than the predetermined value $\alpha 2$, the target temperature TT is set to a predetermined value $\alpha 3$ (600° C., for instance) in Step S214 and the control proceeds to Step S206. If the particulate matter accumulation quantity MPM is less than the predetermined value $\alpha 2$, the target temperature TT is set to a predetermined value $\alpha 4$ (650° C., for instance) in Step S205, and the control proceeds to Step S206. The predetermined value $\alpha 3$ is less than the predetermined value $\alpha 4$.

In Step S206, the engine rotation speed NE and the accelerator position ACCP are inputted to the ECU 6. Then, in Step S207, the basic temperature increase manipulated variable calculating means calculates the basic temperature increase duty ratio Db based on the engine rotation speed NE and the accelerator position ACCP. The basic temperature increase duty ratio Db is set to a temperature increase duty ratio, which brings the DPF temperature T to the predetermined value $\alpha 3$ or the predetermined value $\alpha 4$ as the target temperature TT in each operating state, for instance.

Then, in Step S208, the first temperature estimate T1 is calculated based on the information related to the area upstream of the DPF 3. More specifically, the first temperature estimate T1 is calculated from the engine rotation speed NE, the accelerator position ACCP, the previous temperature increase duty ratio Dold, the air intake quantity GA and the upstream exhaust gas temperature sensor output THIN in Step S208. Then, in Step S209, the deviation E1 of the first temperature estimate T1 from the predetermined value $\alpha 3$ or the predetermined value α4 as the target temperature TT is calculated, and the first correction value C1 is calculated in accordance with the deviation E1. For instance, the first correction value C1 is calculated based on the deviation E1, the integrated value of the deviation E1 and the change of the deviation E1 per unit time as shown by a following formula (3). In the formula (3), KP1, KI1 and KD represent correction gains.

$$C1 = KP1 \times E1 + KI1 \times \Sigma E1 + KD \times \Delta E1/\Delta t, \quad (3)$$

Then, in Step S210, the second temperature estimate T2 is calculated based on the information related to the area downstream of the DPF 3. More specifically, the second temperature estimate T2 is calculated from the engine rotation speed NE and the downstream exhaust gas temperature sensor output THEX. Then, in Step S211, the deviation E2 of the second temperature estimate T2 from the predetermined value α3 or the predetermined value α4 as the target temperature TT is calculated, and the second correction value C2 is calculated in accordance with the deviation E2. For instance, the second correction value C2 is calculated in accordance with the deviation E2 and the integrated value of the deviation E2 as shown by a following formula (4). In the formula (4), KP2 and KI2 represent correction gains.

$$C2 = KP2 \times E2 + KI2 \times \Sigma E2, \quad (4)$$

Then, in Step S212, the temperature increase duty ratio D calculated in previous time is stored as the previous temperature increase duty ratio Dold in the memory. Then, in Step S213, the temperature increase duty ratio D is calculated by correcting the basic temperature increase duty ratio Db calculated in Step S207 with the first correction value C1 calculated in Step S209 and the second correction value C2 calculated in Step S211, or by adding the first and second correction values C1, C2 to the basic temperature increase duty ratio Db.

As explained above, the target temperature TT is changed stepwise in accordance with the particulate matter accumulation quantity MPM during the regeneration of the DPF 3. Thus, the target temperature TT is increased to improve the response when a small amount of the particulate matters remains in the DPF 3, and the target temperature TT is decreased to improve safety when a large amount of the particulate matters remains in the DPF 3. Thus, detailed control can be performed.

Third Embodiment

Figure 17:
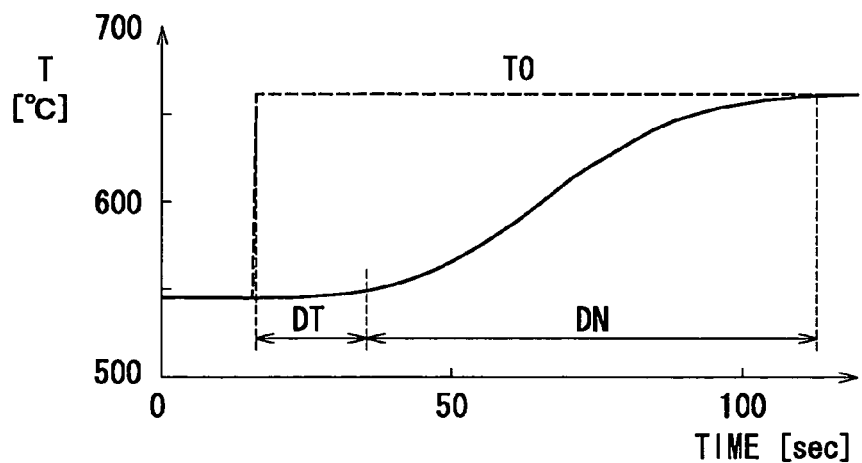
FIG. 17 is a time chart showing a change in temperature of a DPF with respect to a change in convergence temperature according to the third embodiment.
Figure 18:
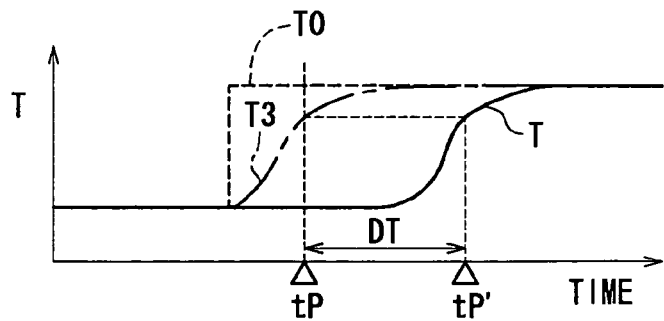
FIG. 18 is a time chart showing a relationship between the change in the temperature of the DPF and a change in a temperature estimate considering only an nth-order delay according to the third embodiment.
Figure 16:
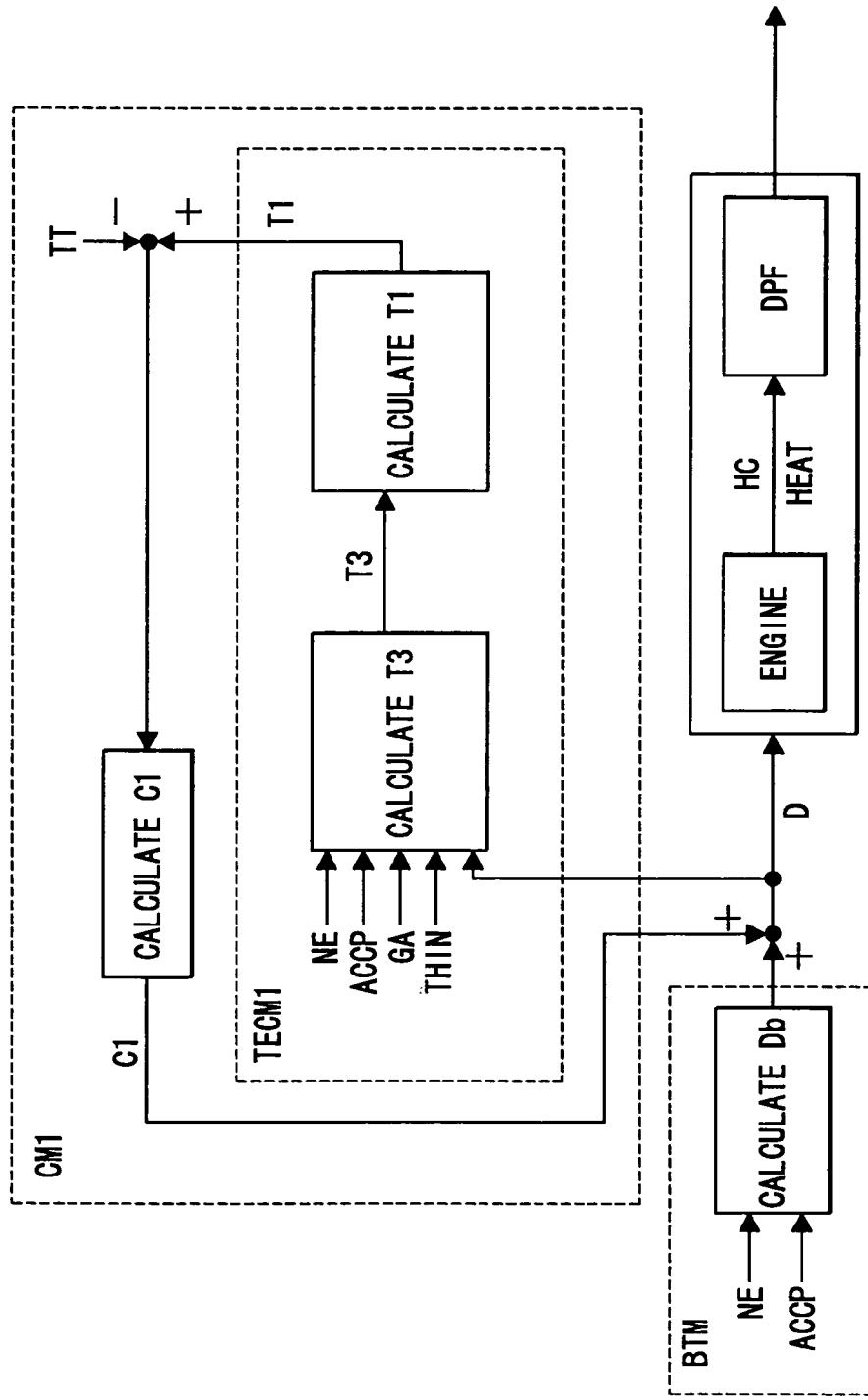
FIG. 16 is a block diagram showing a characteristic portion of regeneration control performed by an ECU according to a third embodiment of the present invention.

Next, regeneration control of the DPF 3 performed by the ECU 6 according to a third embodiment of the present invention will be explained based on FIGS. 16 to 18. Structure of the exhaust gas purification system of the third embodiment is the same as the first embodiment. A block diagram shown in FIG. 16 shows a characteristic portion of the regeneration control of the third embodiment, or the first temperature estimate calculating means of the first correcting means in detail. In the third embodiment, in the calculation of the first temperature estimate T1 from which the first correction value C1 is calculated, the delay in the temperature change with respect to the convergence temperature T0 is divided into dead time and an nth-order delay. The convergence temperature T0 is calculated based on the information related to the area upstream of the DPF 3 including the state of the exhaust gas flowing into the DPF 3, the operating state of the engine 1 and the temperature increase manipulated variable D of the temperature increasing means. Then, the temperature of the DPF 3 (the first temperature estimate T1) is calculated in accordance with the nth-order delay out of the dead time and the nth-order delay.

More specifically, the ECU 6 includes pre-correction temperature estimate calculating means. The pre-correction temperature estimate calculating means calculates the convergence temperature T0, to which the DPF temperature T eventually converges, from the engine rotation speed NE, the accelerator position ACCP or the fuel injection quantity, the air intake quantity GA, the temperature increase manipulated variable D and the temperature of the exhaust gas upstream of the DPF 3. Then, the pre-correction temperature estimate calculating means calculates a pre-correction temperature estimate T3 with respect to the change of the convergence temperature T0 by considering only the nth-order delay. As shown in FIG. 17, the delay in the change of the temperature T of the DPF 3 with respect to the change of the convergence temperature T0 can be divided into the dead time DT and the nth-order delay DN. More specifically, in the case where the convergence temperature T0 is changed stepwise, a period since the convergence temperature T0 is changed until the DPF temperature T converges to the convergence temperature T0 can be divided into a steady period (the dead time), in which the DPF temperature T does not substantially change, and the other period (the nth-order delay), in which the DPF temperature T changes largely compared to the steady period, as is ensured through experimentation. If the temperature estimate T3 is calculated by delaying the change of the convergence temperature T0 by the nth-order delay DN expressed by an nth-order delay transfer function, the temperature estimate T3 at the present time tP indicates the actual DPF temperature T at a time point tP' later than the present time tP by the dead time DT as shown in FIG. 18.

Thus, the pre-correction temperature estimate T3 is calculated by predicting the DPF temperature T at the time point tP' later than the present time tP by the dead time DT based on the relationship shown in FIGS. 17 and 18 in accordance with the present state including the state of the exhaust gas, the engine operating state and the temperature increase manipulated variable of the temperature increasing means. Subsequently, the first temperature estimate T1 is calculated based on the pre-correction temperature estimate T3. Then, the first correction value C1 is calculated based on the result of the comparison between the first temperature estimate T1 and the target temperature TT, and the temperature increase manipulated variable D is corrected, like the first embodiment. Thus, the temperature increase manipulated variable D is corrected by predicting the future deficiency in the heat quantity based on the history of the state including the state of the exhaust gas, the engine operating state and the temperature increase manipulated variable D of the temperature increasing means up to the present time tP. Then, the heat quantity corresponding to the deficiency is supplied in advance. Thus, the response can be improved.

Fourth Embodiment

Figure 19:
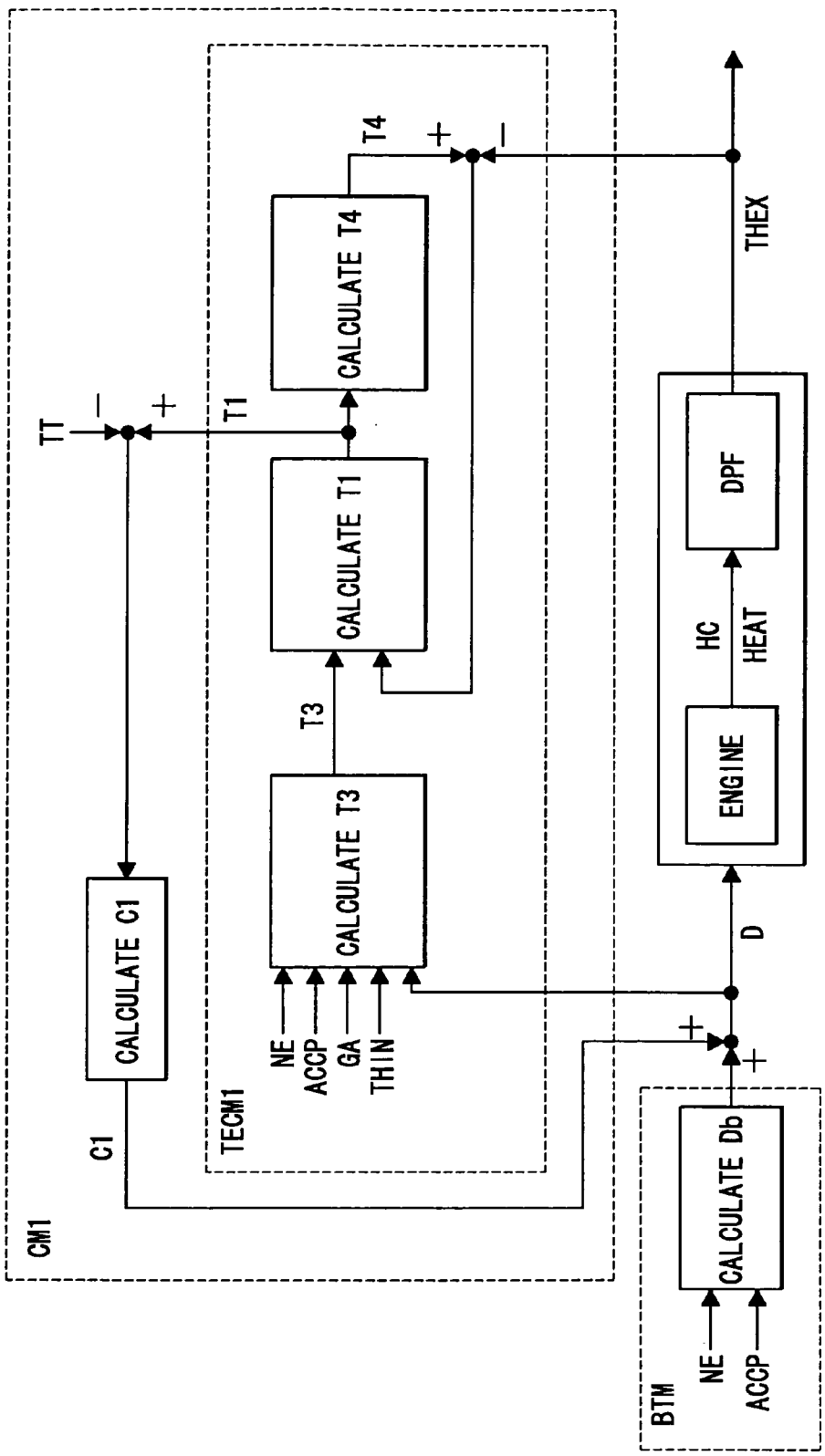
FIG. 19 is a block diagram showing a characteristic portion of regeneration control performed by an ECU according to a fourth embodiment of the present invention.
Figure 20:
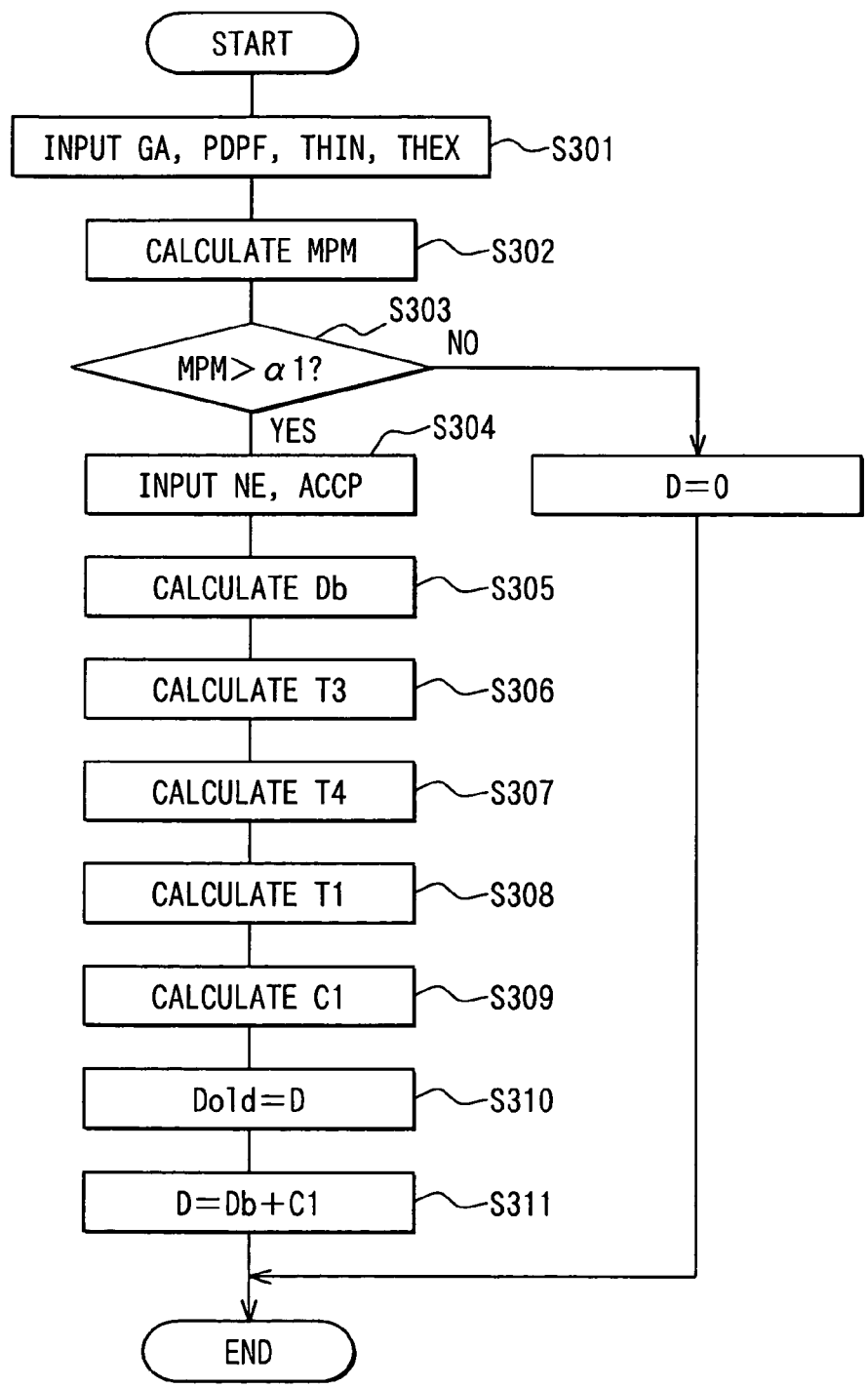
FIG. 20 is a flowchart showing the regeneration control performed by the ECU according to the fourth embodiment.
Figure 21:
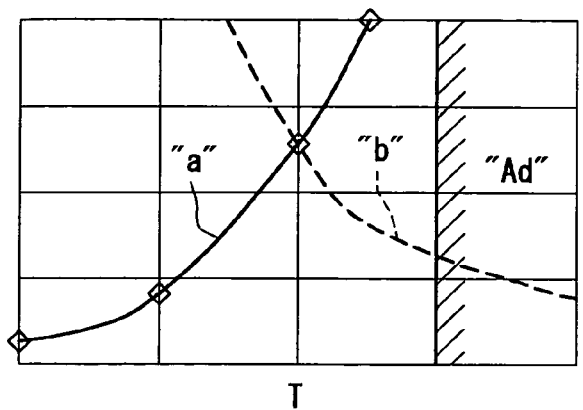
FIG. 21 is a graph showing a relationship between temperature of a DPF and combustion speed of particulate matters or fuel consumption during regeneration of a DPF of a related art.
Figure 22:
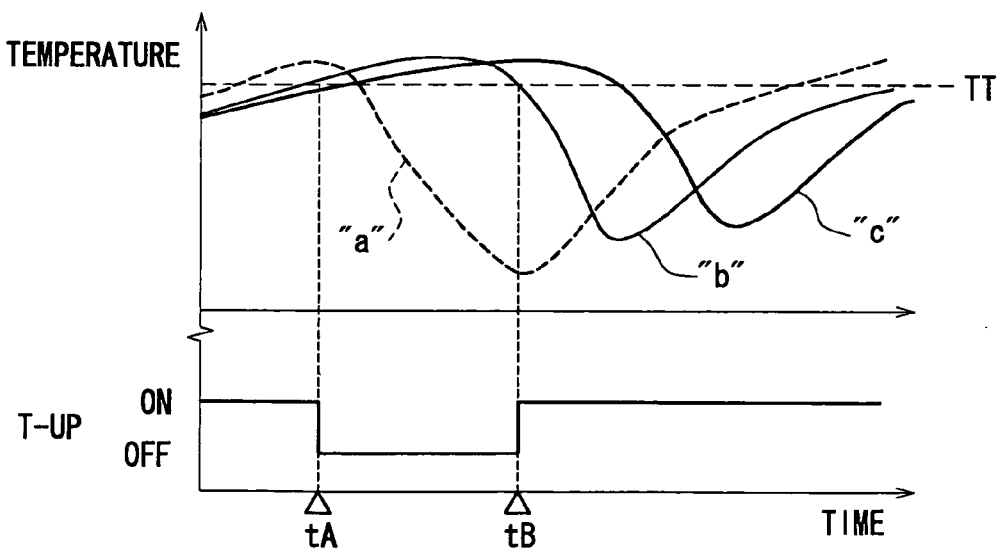
FIG. 22 is a time chart showing a change in temperature of the DPF of the related art at the time when temperature increasing means is stopped and started again.

Next, regeneration control of the DPF 3 performed by the ECU 6 according to a fourth embodiment of the present invention will be explained based on FIGS. 19 and 20. The structure of the exhaust gas purification system of the fourth embodiment is the same as the first embodiment. A block diagram in FIG. 19 shows a characteristic portion of the regeneration control of the present embodiment. In the present embodiment, when the first temperature estimate T1 is calculated based on the pre-correction temperature estimate T3, the first temperature estimate T1 is corrected based on the temperature of the exhaust gas downstream of the DPF 3, which can be measured actually, in order to further improve the accuracy of the first temperature estimate T1. The temperature of the exhaust gas downstream of the DPF 3 reflects the temperature of the DPF 3. Therefore, the actually measured value of the temperature of the exhaust gas downstream of the DPF 3 should preferably be used in the correction of the first temperature estimate T1. However, the change in the temperature of the exhaust gas downstream of the DPF 3 is delayed from the change in the first temperature estimate T1, which represents the change in the DPF temperature. Therefore, the temperature of the exhaust gas downstream of the DPF 3 cannot be compared with the first temperature estimate T1 directly.

Therefore, the ECU 6 includes exhaust gas temperature estimate calculating means for estimating the temperature of the exhaust gas downstream of the DPF 3 (DPF downstream exhaust gas temperature) from the first temperature estimate T1 by using a transfer function of the change in the temperature of the exhaust gas downstream of the DPF 3 with respect to the change in the DPF temperature. The first temperature estimate T1 is corrected in accordance with a deviation between the calculated estimate of the DPF downstream exhaust gas temperature and the actually measured temperature of the exhaust gas downstream of the DPF 3 (the downstream exhaust gas temperature sensor output THEX) so that the deviation is reduced.

The first correction value C1 is calculated based on the deviation of the first temperature estimate T1 from the target temperature TT. Then, the temperature increase manipulated variable D is corrected with the first correction value C1. As a result, the response can be improved further.

Next, the regeneration control of the present embodiment will be explained based on a flowchart shown in FIG. 20. First, in Step S301, the air intake quantity GA sensed by the airflow meter 53 and the pressure difference PDPF across the DPF 3 sensed by the pressure difference sensor 8 are inputted to the ECU 6. Meanwhile, in Step S301, the upstream exhaust gas temperature sensor output THIN and the downstream exhaust gas temperature sensor output THEX are inputted to the ECU 6 from the exhaust gas temperature sensors 51, 52 disposed upstream and downstream of the DPF 3. Then, in Step S302, the flow rate QE of the exhaust gas passing through the DPF 3 is calculated based on the air intake quantity GA and the downstream exhaust gas temperature sensor output THEX, and the particulate matter accumulation quantity MPM of the DPF 3 is calculated based on the exhaust gas flow rate QE and the pressure difference PDPF across the DPF 3. The pressure difference PDPF across the DPF 3 and the particulate matter accumulation quantity MPM have the relationship shown in FIG. 4 with respect to the exhaust gas flow rate QE. Therefore, the particulate matter accumulation quantity MPM can be estimated based on the relationship shown in FIG. 4.

Then, in Step S303, it is determined whether the regeneration of the DPF 3 is necessary or not by comparing the calculated particulate matter accumulation quantity MPM with a predetermined value $\alpha 1$ (3 g/L, for instance). If the particulate matter accumulation quantity MPM is greater than the predetermined value $\alpha 1$, it is determined that the regeneration of the DPF 3 is necessary, and the temperature increasing operation of the DPF 3 is performed. The temperature increasing means performs the post-injection, for instance. In steps following Step S303, the basic temperature increase duty ratio (the basic temperature increase manipu-lated variable) Db is calculated and corrected. If the particulate matter accumulation quantity MPM is equal to or less than the predetermined value $\alpha 1$, the temperature increase duty ratio D is set to 0% and the control is ended without performing the temperature increasing operation.

Then, in Step S304, the engine rotation speed NE and the accelerator position ACCP are inputted to the ECU 6. Then, in Step S305, the basic temperature increase manipulated variable calculating means included in the ECU 6 calculates the basic temperature increase duty ratio Db based on the engine rotation speed NE and the accelerator position ACCP. The basic temperature increase duty ratio Db is set to a temperature increase duty ratio ("A" in FIG. 8), which brings the DPF temperature T to a predetermined constant value (650° C., for instance) as the target temperature TT in each operating state, for instance.

Then, in Step S306, the DPF temperature is estimated based on the information related to the area upstream of the DPF 3. More specifically, pre-correction temperature estimate calculating means included in the ECU 6 calculates a pre-correction temperature estimate T3 based on the engine rotation speed NE, the accelerator position ACCP, the previous temperature increase duty ratio Dold calculated in the previous time, the air intake quantity GA and the upstream exhaust gas temperature sensor output THIN. For instance, the pre-correction temperature estimate calculating means calculates a quantity of the hydrocarbon discharged from the engine 1 based on the engine rotation speed NE, the accelerator position ACCP and the previous temperature increase duty ratio Dold. Then, the pre-correction temperature estimate calculating means calculates the pre-correction temperature estimate T3 based on the DPF temperature achieved by the reaction heat, which is generated from the hydrocarbon, and the upstream exhaust gas temperature sensor output THIN. At that time, the change in the temperature due to the heat transfer between the DPF 3 and the exhaust gas is expressed by dead time and a transfer function of a second order delay. Then, the DPF temperature at the time later than the present time by the dead time is predicted by calculating the delay based on the second order delay alone.

Then, in Step S307, exhaust gas temperature estimate calculating means included in the ECU 6 calculates an estimate of the temperature of the exhaust gas downstream of the DPF 3 (a DPF downstream exhaust gas temperature estimate T4) based on the previous first temperature estimate T1 calculated in previous time. More specifically, the present DPF temperature is estimated by correcting the delay in the first temperature estimate T1 due to the dead time. Then, the DPF downstream exhaust gas temperature estimate T4 is calculated based on the estimated present DPF temperature by using a transfer function expressing a relationship between the change in the temperature of the exhaust gas downstream of the DPF 3 and the change in the DPF temperature.

Then, in Step S308, the first temperature estimate T1 is calculated from the pre-correction temperature estimate T3 and a deviation E3 between the DPF downstream exhaust gas temperature estimate T4 and the downstream exhaust gas temperature sensor output THEX. At that time, the first temperature estimate T1 is corrected in accordance with the deviation E3 based on a following formula (5), for instance. In the formula (5), KC represents a correction gain.

$$T1 = T3 + \Sigma E3 \times KC, \quad (5)$$

Then, in Step S309, first correction value calculating means calculates a deviation E1 of the calculated first temperature estimate T1 from a predetermined value as the target temperature TT (650° C., for instance), and calculates a first correction value C1 in accordance with the deviation E1 based on a following formula (6), for instance. In the formula (6), KP1, KI1 and KD represent correction gains. Thus, the first correction value C1 is calculated in accordance with the deviation E1, the integrated value of the deviation E1 and the change of the deviation E1 per unit time.

$$C1 = KP1 \times E1 + KI1 \times \Sigma E1 + KD \times \Delta E1/\Delta t, \quad (6)$$

Then, in Step S310, the temperature increase duty ratio D calculate in previous time is stored in the memory as the previous temperature increase duty ratio Dold. Then, in Step S311, the temperature increase duty ratio D is calculated by correcting the basic temperature increase duty ratio Db calculated in Step S305 with the first correction value C1 calculated in Step S309, or by adding the first correction value C1 to the basic temperature increase duty ratio Db.

Thus, the accuracy of the first temperature estimate T1 is improved. As a result, detailed control achieving better response can be performed.

The present invention should not be limited to the disclosed embodiments, but may be implemented in many other ways without departing from the spirit of the invention.

What is claimed is:

1. A method of purifying exhaust gas of an internal combustion engine having a particulate filter disposed in an exhaust passage of the engine, the method comprising:
   increasing a temperature of the particulate filter;
   estimating a quantity of particulate matters accumulated in the particulate filter; and
   controlling the increasing of the temperature of the particulate filter to a target temperature so that the particulate matters accumulated in the particulate filter are combusted and eliminated if the estimated quantity of the particulate matters accumulated in the particulate filter exceeds a predetermined value, wherein
   controlling the increasing of the temperature of the particulate filter includes estimating the temperature of the particulate filter based on a state of the exhaust gas flowing into the particulate filter, an operating state of the engine and a manipulated variable associated with increasing the temperature, and correcting the manipulated variable based on a result of comparison between the estimated temperature of the particulate filter and the target temperature; and
   a convergence temperature is calculated, to which the temperature of the particulate filter eventually converges if the present state of the exhaust gas flowing into the particulate filter, the present operating state of the engine and the present manipulated variable are retained for a long time, based on the state of the exhaust gas flowing into the particulate filter, the operating state of the engine and the manipulated variable, and a first temperature estimate is calculated in accordance with a delay in a change of the temperature of the particulate filter due to a heat capacity of the particulate filter.

2. The method as in claim 1, wherein
   a flow rate and temperature of the exhaust gas flowing into the particulate filter is employed as the state of the exhaust gas flowing into the particulate filter, and engine rotation speed and an accelerator position or a fuel injection quantity is employed as the operating state of the engine.

3. The method as in claim 1, wherein
   the delay in the change of the temperature of the particulate filter is divided with respect to the calculated convergence temperature into dead time and an nth-order delay, and the first temperature estimate is calculated in accordance with the nth-order delay out of the dead time and the nth-order delay.

4. The method as in claim 1, wherein
   a first correction value is calculated so that the manipulated variable is increased or decreased in accordance with a difference between the estimated temperature of the particulate filter and the target temperature.

5. The method as in claim 1, wherein
   the target temperature is set to a predetermined constant value or is changed in accordance with a quantity of the particulate matters remaining in the particulate filter during the operation for increasing the temperature of the particulate filter.

6. The method as in claim 1, wherein
   controlling the increasing of the temperature includes estimating the temperature of the particulate filter based on a state of the exhaust gas flowing out of the particulate filter and correcting the manipulated variable based on a result of comparison between the estimated temperature of the particulate filter and the target temperature.

7. The method as in claim 6, wherein the
   temperature of the exhaust gas flowing out of the particulate filter is employed as the state of the exhaust gas flowing out of the particulate filter.

8. The method as in claim 6, wherein a second temperature estimate is calculated by correcting the temperature of the exhaust gas flowing out of the particulate filter based on the operating state of the engine, or by using an inverse function of a transfer function of a change in the temperature of the exhaust gas flowing out of the particulate filter with respect to the change in the temperature of the particulate filter.

9. The method as in claim 6, wherein
   a second correction value is calculated so that the manipulated variable is increased or decreased in accordance with a difference between the estimated temperature of the particulate filter and the target temperature.

10. An exhaust gas purification system of an internal combustion engine, comprising:
    a particulate filter disposed in an exhaust passage of the engine;
    temperature increasing means for increasing temperature of the particulate filter;
    particulate matter accumulation quantity estimating means for estimating a quantity of particulate matters accumulated in the particulate filter; and
    temperature increase controlling means for operating the temperature increasing means to increase the temperature of the particulate filter to a target temperature so that the particulate matters accumulated in the particulate filter are combusted and eliminated if the quantity of the particulate matters accumulated in the particulate filter, which is estimated by the particulate matter accumulation quantity estimating means, exceeds a predetermined value, wherein
    the temperature increase controlling means includes first correcting means for estimating the temperature of the particulate filter based on a state of the exhaust gas flowing into the particulate filter, an operating state of the engine and a manipulated variable of the temperature increasing means, and for correcting the manipulated variable of the temperature increasing means based on a result of comparison between the estimated temperature of the particulate filter and the target temperature; and the first correcting means calculates convergence temperature, to which the temperature of the particulate filter eventually converges if the present state of the exhaust gas flowing into the particulate filter, the present operating state of the engine and the present manipulated variable of the temperature increasing means are retained for a long time, based on the state of the exhaust gas flowing into the particulate filter, the operating state of the engine and the manipulated variable of the temperature increasing means, and calculates a first temperature estimate in accordance with a delay in a change of the temperature of the particulate filter due to a heat capacity of the particulate filter.

11. The exhaust gas purification system of the internal combustion engine as in claim 10, wherein the first correcting means employs a flow rate and temperature of the exhaust gas flowing into the particulate filter as the state of the exhaust gas flowing into the particulate filter, and employs engine rotation speed and an accelerator position or a fuel injection quantity as the operating state of the engine.

12. The exhaust gas purification system of the internal combustion engine as in claim 10, wherein the first correcting means calculates a first correction value so that the manipulated variable of the temperature increasing means is increased or decreased in accordance with a difference between the estimated temperature of the particulate filter and the target temperature.

13. The exhaust gas purification system of the internal combustion engine as in claim 10, wherein the target temperature is set to a predetermined constant value or is changed in accordance with a quantity of the particulate matters remaining in the particulate filter during the operation for increasing the temperature of the particulate filter.

14. The exhaust gas purification system of the internal combustion engine as in claim 10, wherein the particulate filter is formed of a ceramic filter, which has an oxidation catalyst upstream thereof or supports the oxidation catalyst thereon.

15. The exhaust gas purification system of the internal combustion engine as in claim 10, wherein the temperature increasing means increases the temperature of the particulate filter by increasing the temperature of the exhaust gas, or by increasing a quantity of hydrocarbon included in the exhaust gas and by generating reaction heat of the hydrocarbon at the oxidation catalyst.

16. The exhaust gas purification system of the internal combustion engine as in claim 10, wherein the temperature increasing means increases a quantity of hydrocarbon included in the exhaust gas by performing at least one of a post-injection for injecting a small amount of fuel after a main injection, retardation of fuel injection timing, restriction of intake air and an increasing operation of exhaust gas recirculation quantity of the exhaust gas recirculated into the intake air.

17. The exhaust gas purification system of the internal combustion engine as in claim 10, wherein the particulate matter accumulation quantity estimating means estimates the quantity of the particulate matters accumulated in the particulate filter based on at least one of a pressure difference across the particulate filter and the operating state of the engine.

18. The exhaust gas purification system of the internal combustion engine as in claim 10, wherein the first correcting means divides the delay in the change of the temperature of the particulate filter with respect to the calculated convergence temperature into dead time and an nth-order delay, and calculates the first temperature estimate in accordance with the nth-order delay out of the dead time and the nth-order delay.

19. The exhaust gas purification system of the internal combustion engine as in claim 18, wherein the temperature increase controlling means includes exhaust gas temperature estimate calculating means for estimating temperature of the exhaust gas downstream of the particulate filter based on the previous first temperature estimate, which is calculated in previous time, and the first correcting means calculates the first temperature estimate in accordance with a difference between the estimated temperature of the exhaust gas downstream of the particulate filter and actually sensed temperature of the exhaust gas downstream of the particulate filter.

20. The exhaust gas purification system of the internal combustion engine as in claim 10, wherein the temperature increase controlling means includes second correcting means for estimating the temperature of the particulate filter based on a state of the exhaust gas flowing out of the particulate filter and for correcting the manipulated variable of the temperature increasing means based on a result of comparison between the estimated temperature of the particulate filter and the target temperature.

21. The exhaust gas purification system of the internal combustion engine as in claim 20, wherein the second correcting means employs the temperature of the exhaust gas flowing out of the particulate filter as the state of the exhaust gas flowing out of the particulate filter.

22. The exhaust gas purification system of the internal combustion engine as in claim 20, wherein the second correcting means calculates a second temperature estimate by correcting the temperature of the exhaust gas flowing out of the particulate filter based on the operating state of the engine, or by using an inverse function of a transfer function of a change in the temperature of the exhaust gas flowing out of the particulate filter with respect to the change in the temperature of the particulate filter.

23. The exhaust gas purification system of the internal combustion engine as in claim 20, wherein the second correcting means calculates a second correction value so that the manipulated variable of the temperature increasing means is increased or decreased in accordance with a difference between the estimated temperature of the particulate filter and the target temperature.

* * * * *